United States Patent
Chun

(10) Patent No.: US 11,924,746 B2
(45) Date of Patent: Mar. 5, 2024

(54) METHOD SUPPORTING SEPARATE DATA TRANSMISSION FOR INDEPENDENT NETWORK SLICES IN WIRELESS COMMUNICATION SYSTEM

(71) Applicant: LG ELECTRONICS INC., Seoul (KR)

(72) Inventor: Sungduck Chun, Seoul (KR)

(73) Assignee: LG ELECTRONICS, INC, Seoul (KR)

( * ) Notice: Subject to any disclaimer, the term of this patent is extended or adjusted under 35 U.S.C. 154(b) by 376 days.

(21) Appl. No.: 17/286,238

(22) PCT Filed: Oct. 21, 2019

(86) PCT No.: PCT/KR2019/013838
§ 371 (c)(1),
(2) Date: Apr. 16, 2021

(87) PCT Pub. No.: WO2020/080913
PCT Pub. Date: Apr. 23, 2020

(65) Prior Publication Data
US 2021/0352575 A1    Nov. 11, 2021

(30) Foreign Application Priority Data
Oct. 19, 2018   (KR) ........................ 10-2018-0125000

(51) Int. Cl.
*H04W 48/16* (2009.01)
*H04W 48/08* (2009.01)
(Continued)

(52) U.S. Cl.
CPC .......... *H04W 48/16* (2013.01); *H04W 48/08* (2013.01); *H04W 72/02* (2013.01); *H04W 74/0833* (2013.01)

(58) Field of Classification Search
CPC ..... H04W 48/16; H04W 48/08; H04W 72/02; H04W 74/0833; H04W 48/12; H04W 60/00; H04W 84/06
See application file for complete search history.

(56) References Cited

U.S. PATENT DOCUMENTS

2012/0250631 A1* 10/2012 Hakola ............... H04W 72/569
370/329
2018/0317263 A1* 11/2018 Ishii ................... H04W 74/0833
2021/0105702 A1*  4/2021 Jiang ..................... H04W 48/08

FOREIGN PATENT DOCUMENTS

KR    1020120034159    4/2012
WO       2014081241    5/2014
(Continued)

OTHER PUBLICATIONS

PCT International Application No. PCT/KR2019/013838, International Search Report dated Feb. 7, 2020, 7 pages.

*Primary Examiner* — Ayanah S George
(74) *Attorney, Agent, or Firm* — LEE, HONG, DEGERMAN, KANG & WAIMEY

(57) ABSTRACT

The present disclosure relates to a communication system and method, in a system providing mobile communication services to terminals, in which the system supports a plurality of network slices, and if the use of some of the network slices is only authorized in a specific application group, the use of resources of the network slices by applications for which the use of the network slices is not authorized is effectively prevented, thus satisfying user experience and needs of the specific network slices.

11 Claims, 10 Drawing Sheets

(51) Int. Cl.
*H04W 72/02* (2009.01)
*H04W 74/08* (2009.01)

(56) References Cited

FOREIGN PATENT DOCUMENTS

| | | |
|---|---|---|
| WO | 2015046787 | 4/2015 |
| WO | 2017002987 | 1/2017 |
| WO | 2017003230 | 1/2017 |

\* cited by examiner

【FIG. 1】
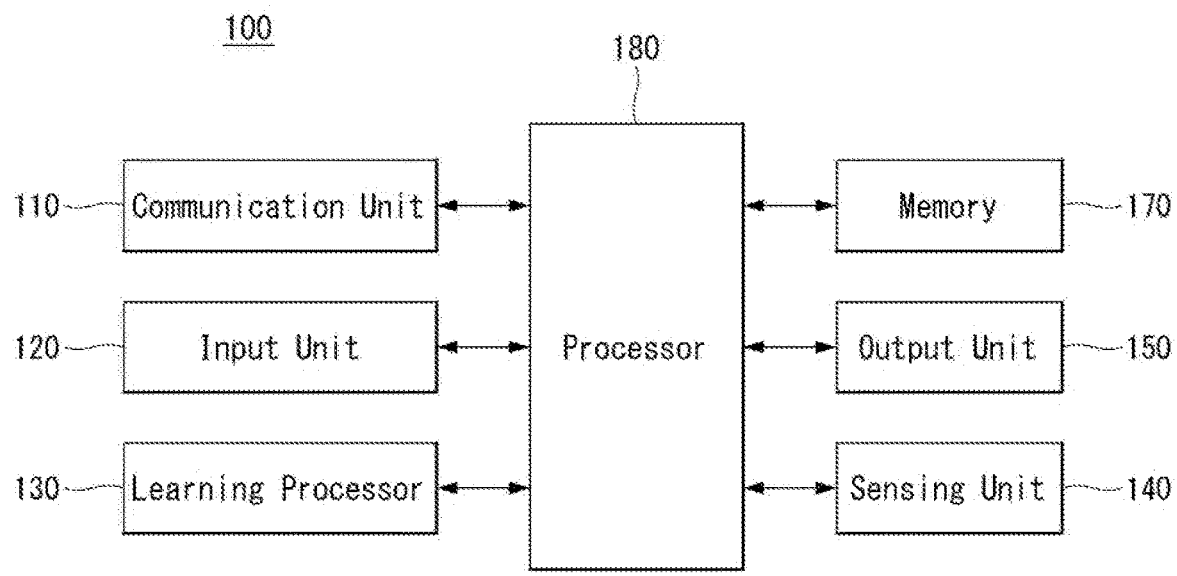
【FIG. 2】
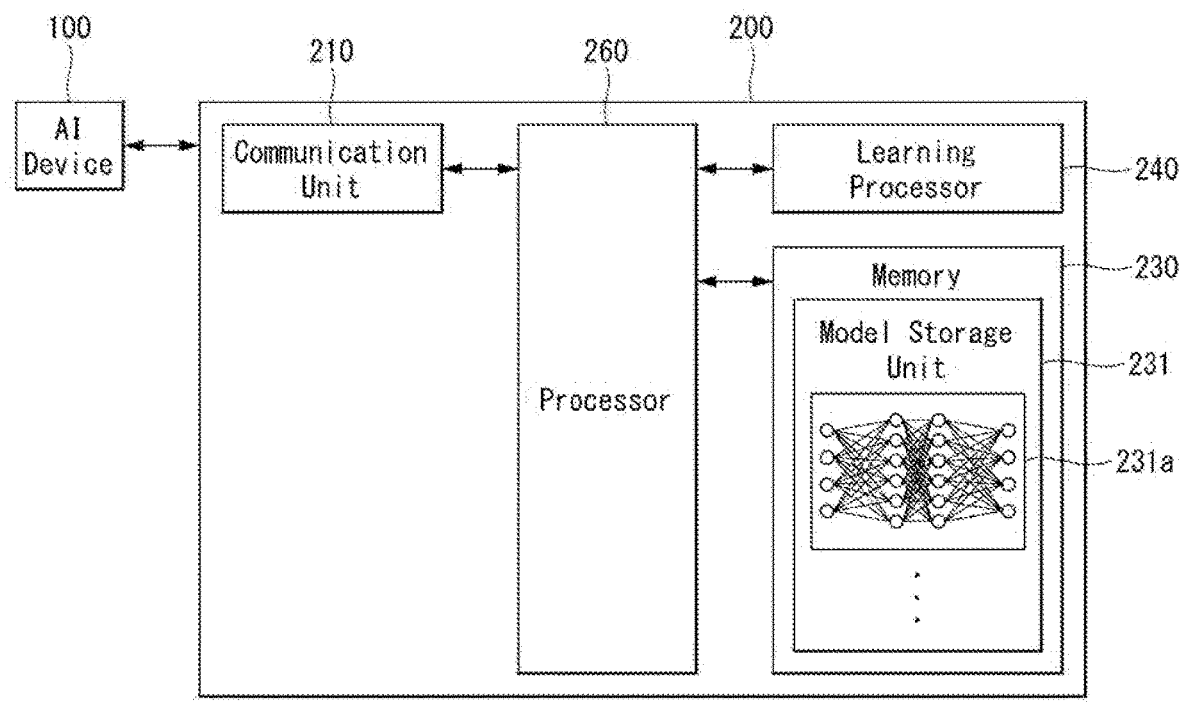

[FIG. 3]
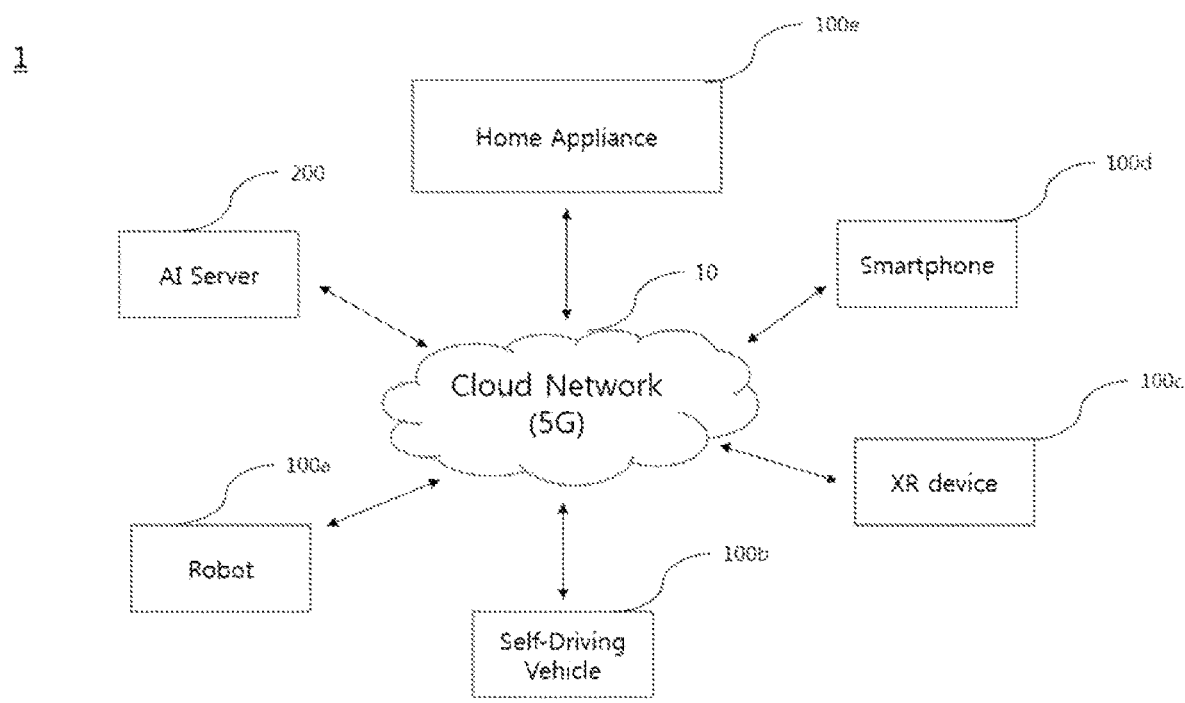

[FIG. 4]
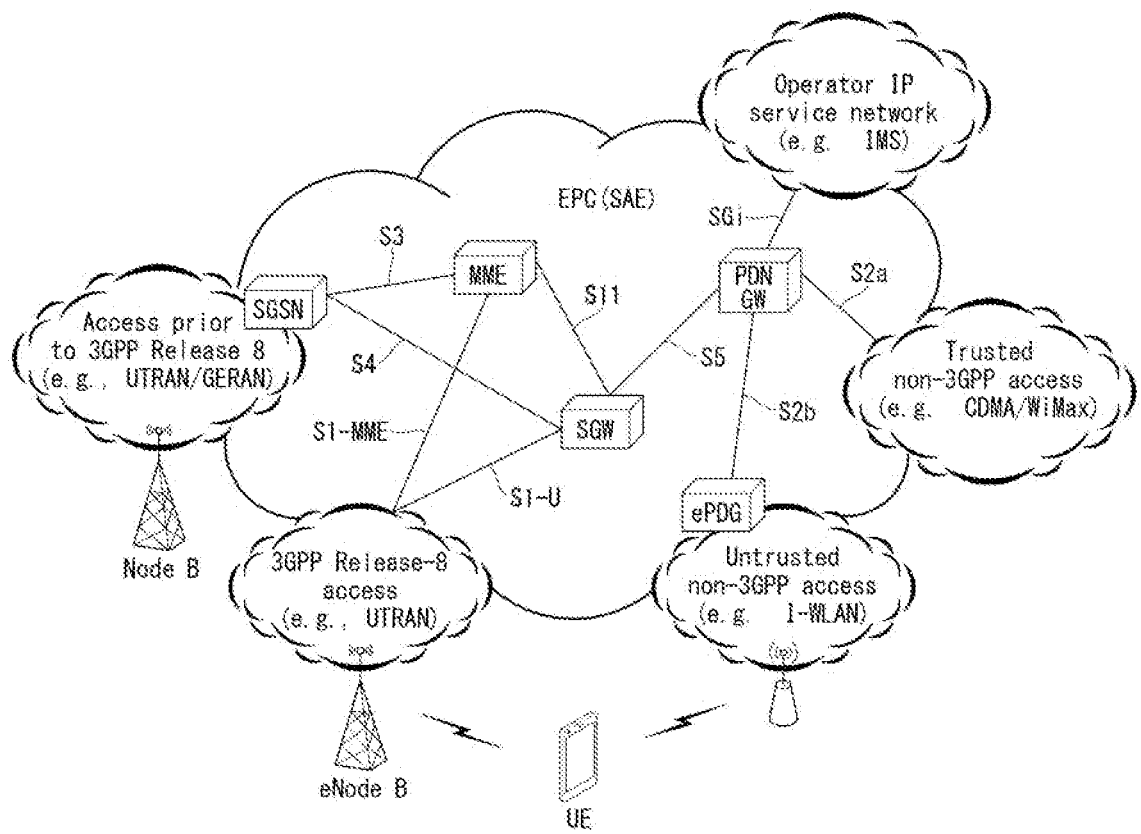

[FIG. 5]
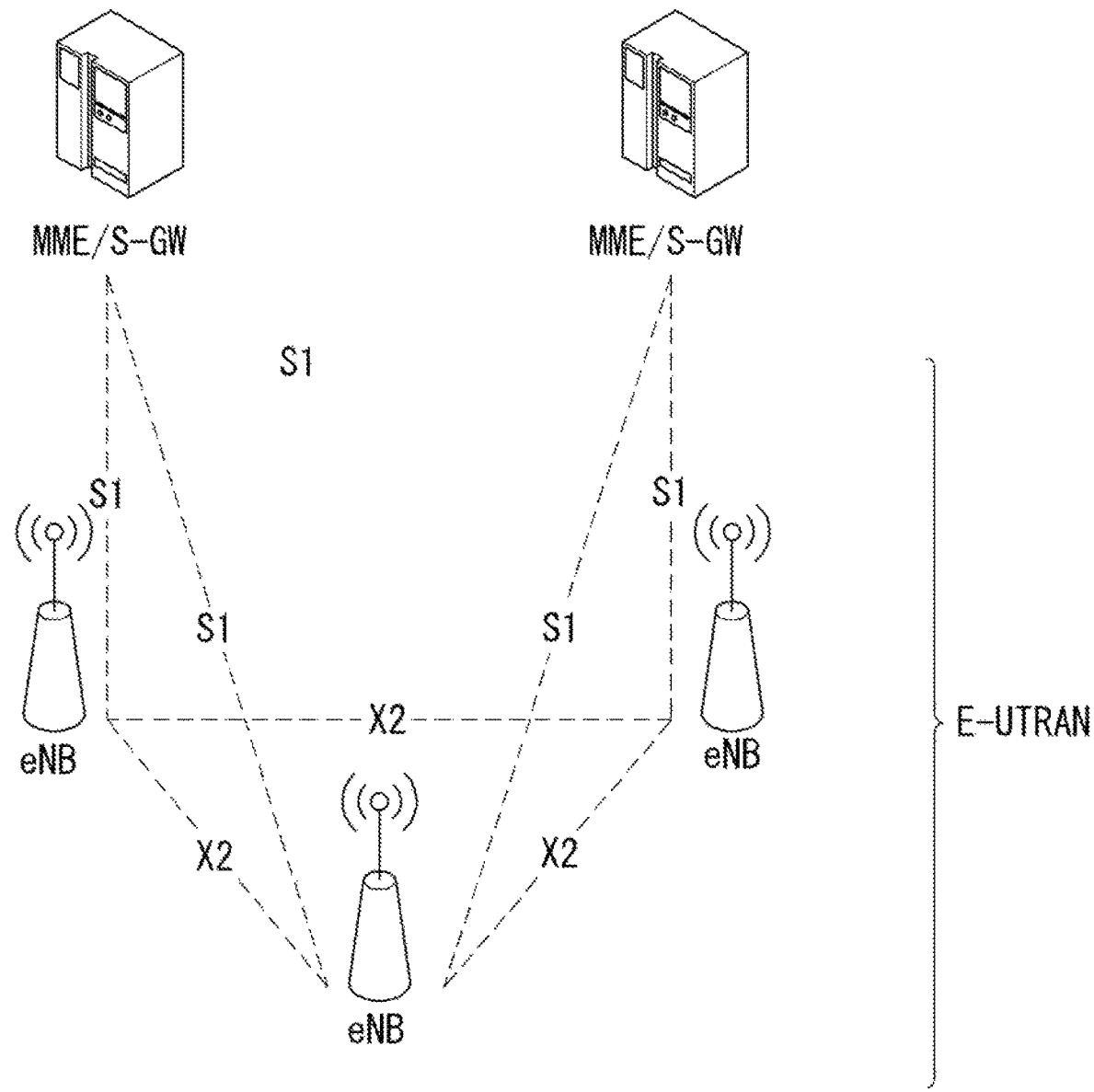

[FIG. 6]
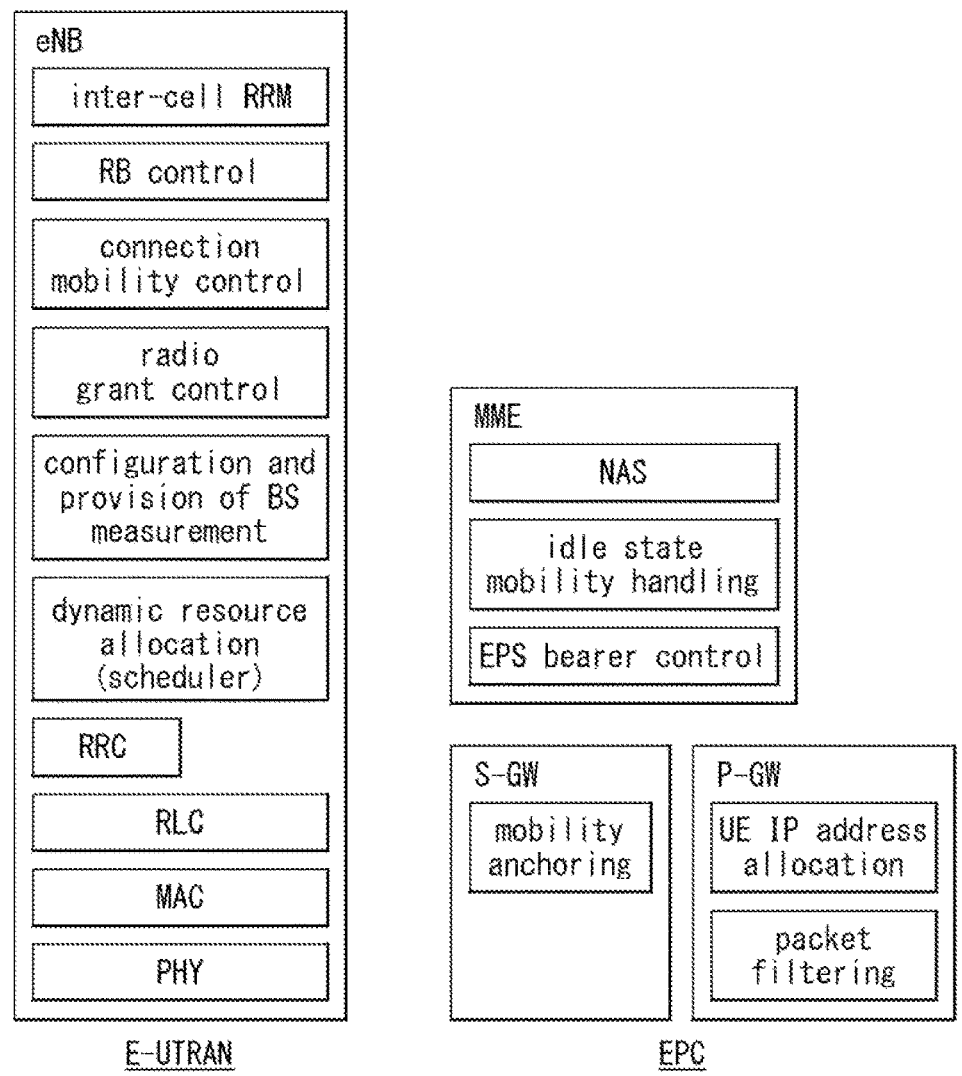
[FIG. 7]
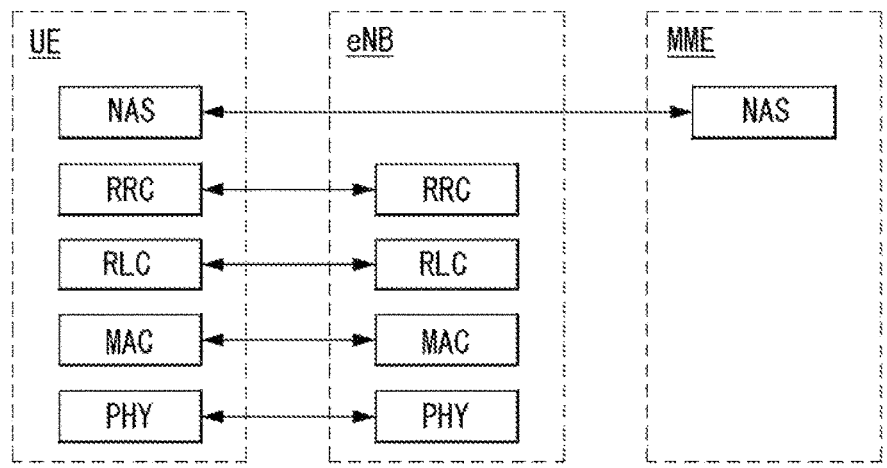

[FIG. 8]
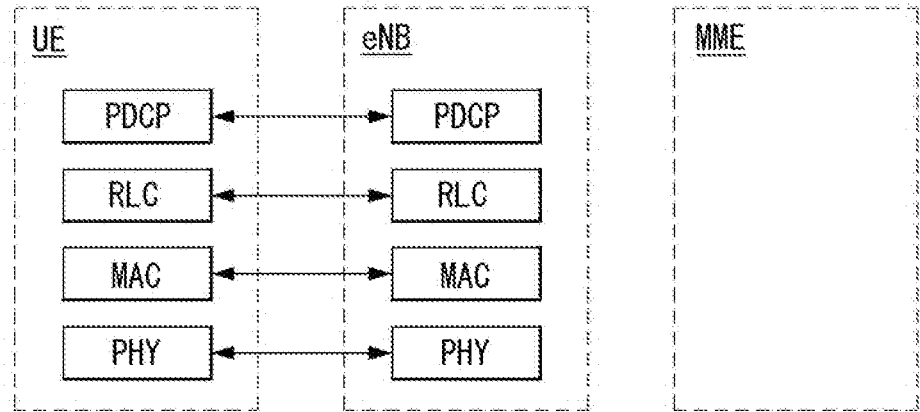
[FIG. 9]
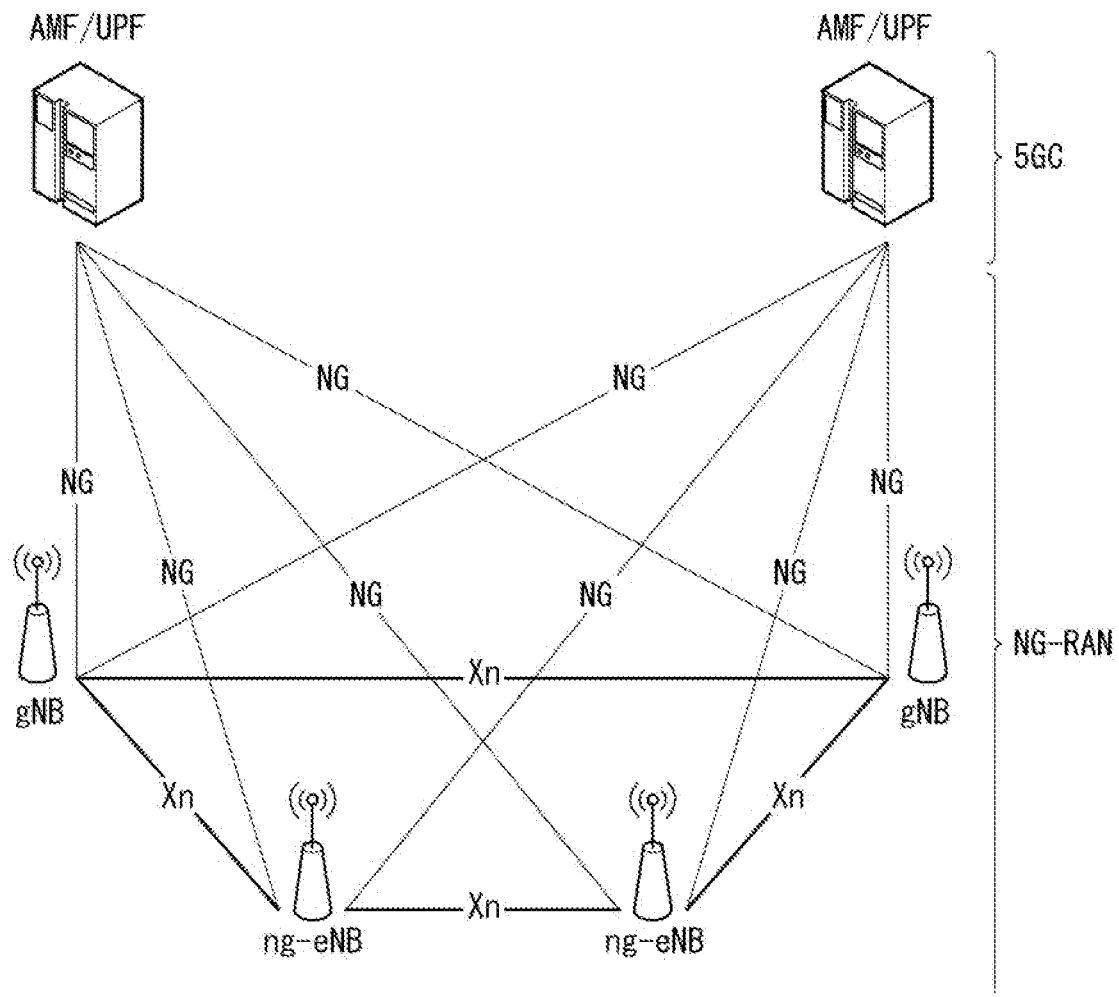

[FIG. 10]
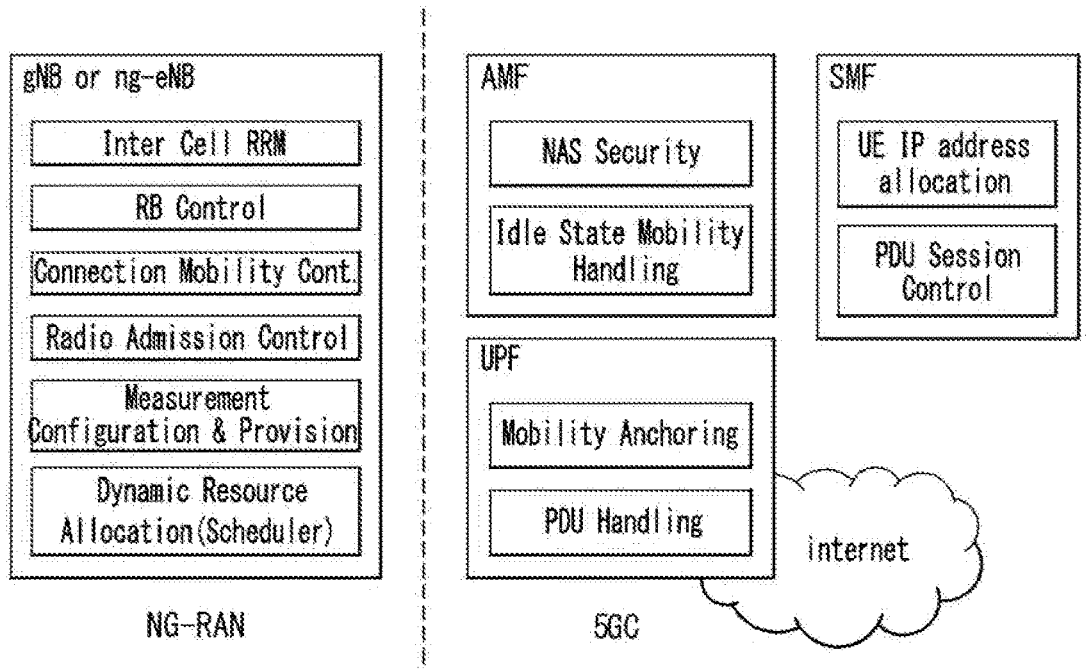
[FIG. 11]
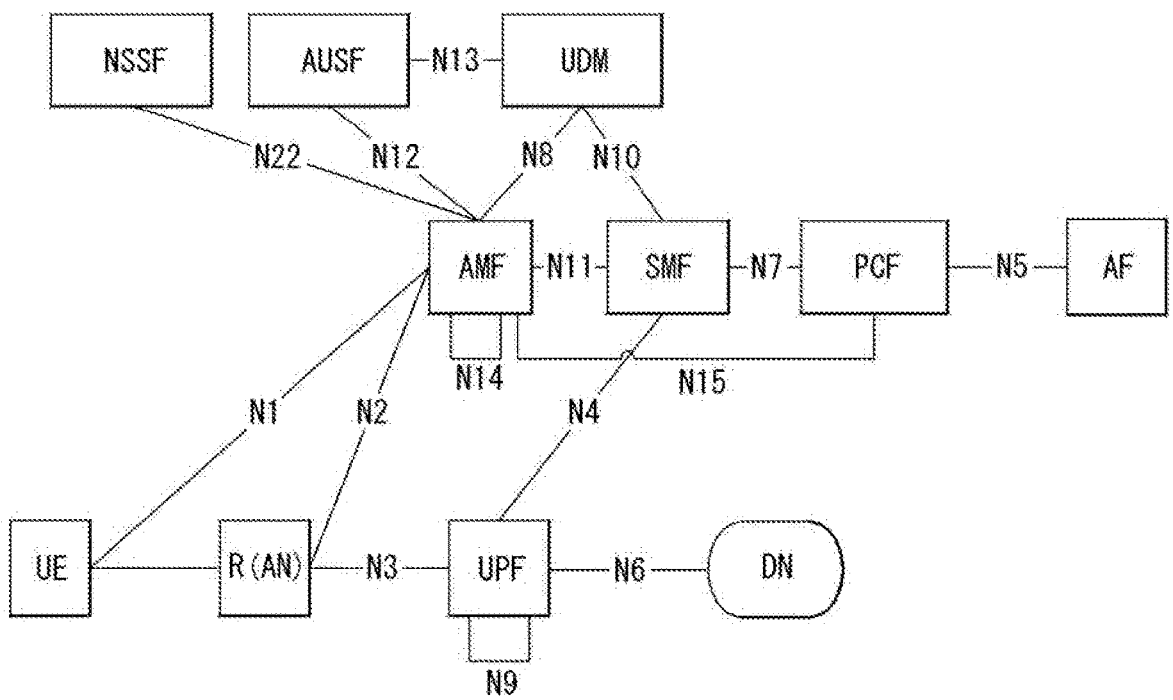

[FIG. 12]
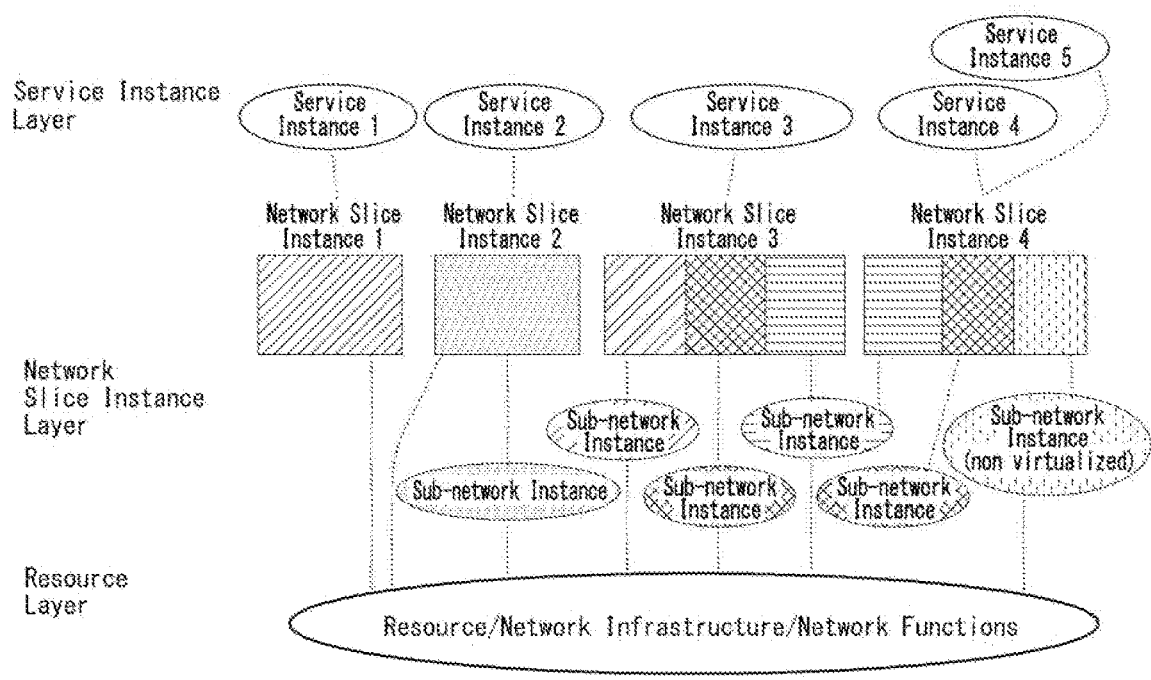
[FIG. 13]
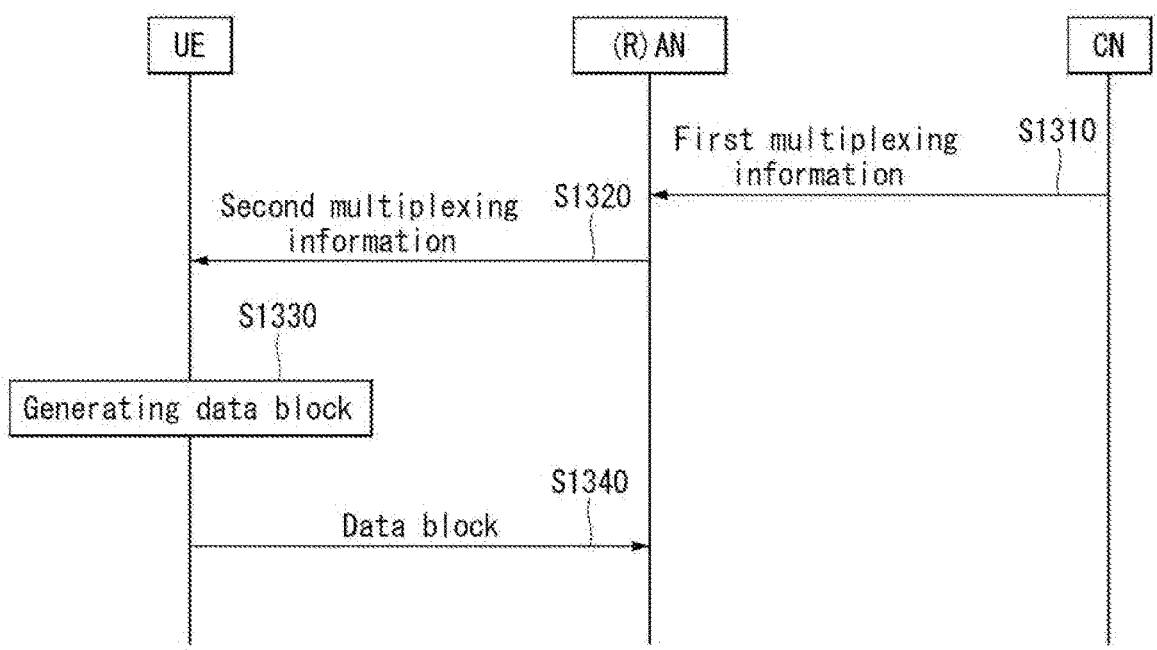

[FIG. 14]
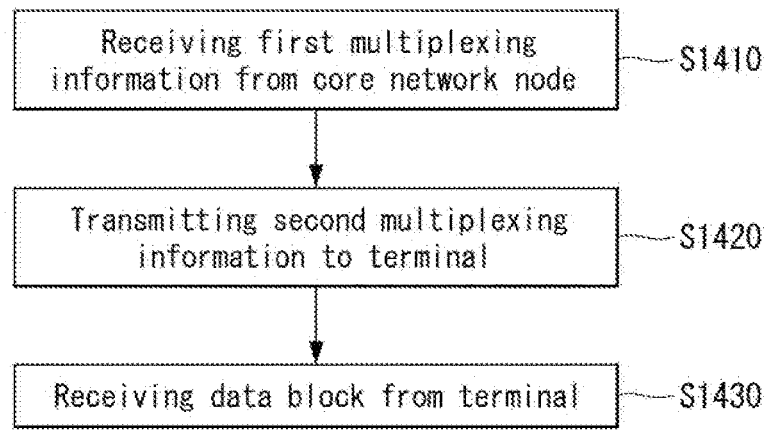
[FIG. 15]
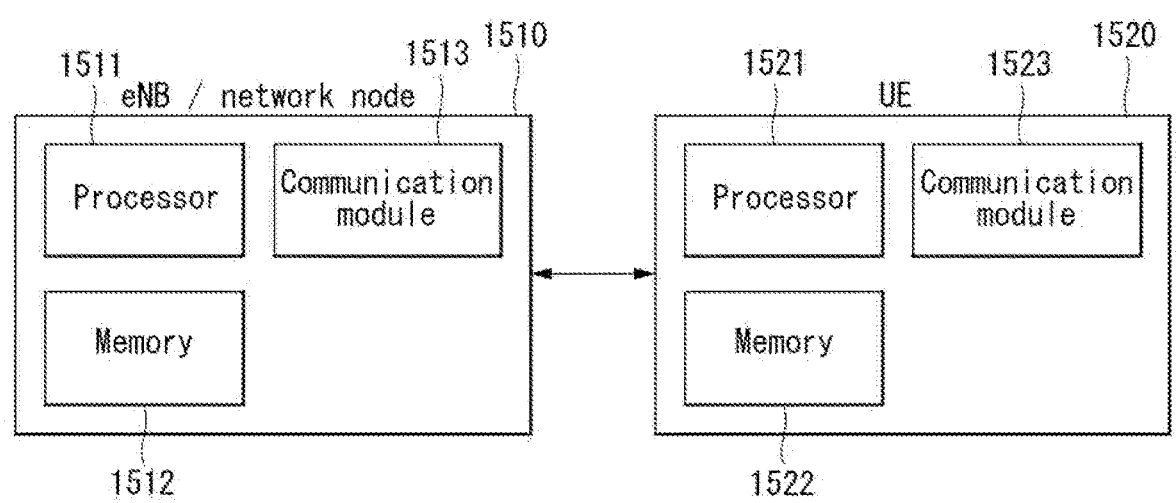

[FIG. 16]
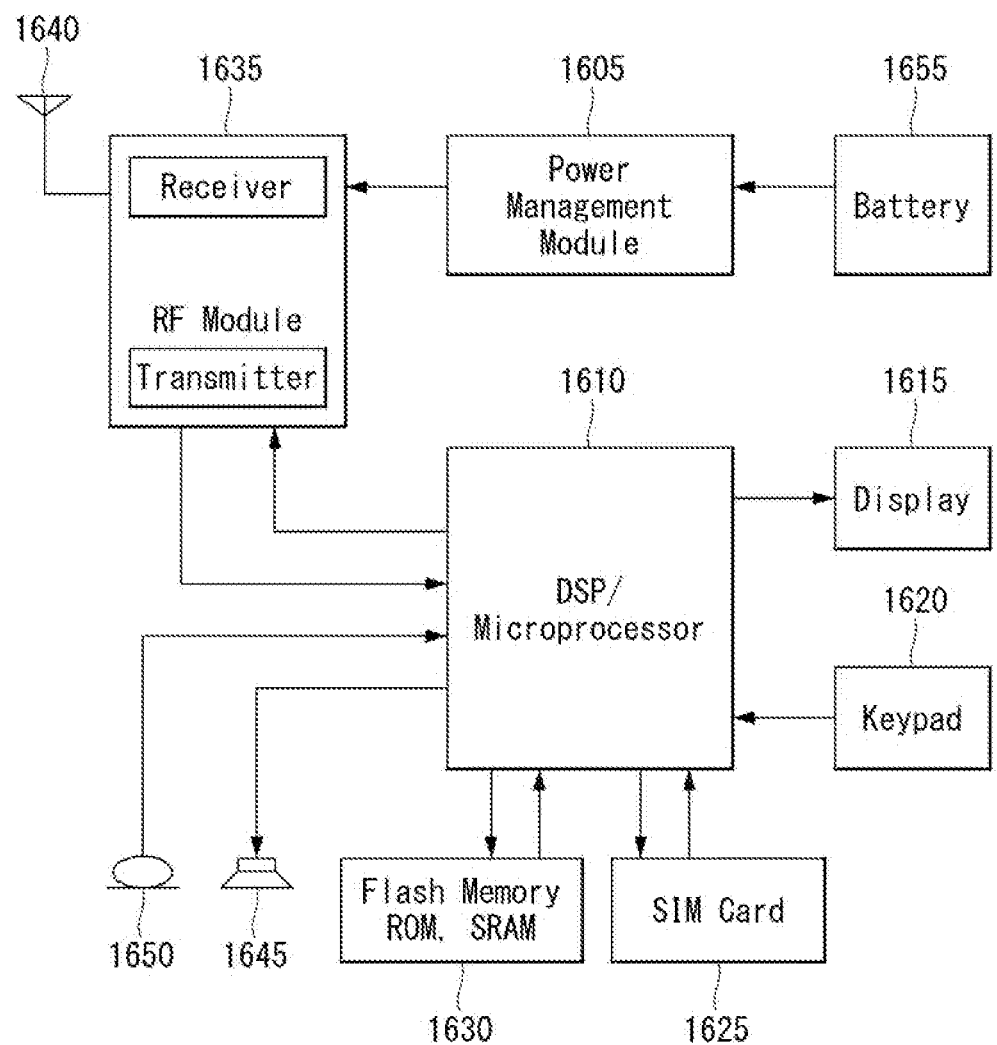

METHOD SUPPORTING SEPARATE DATA TRANSMISSION FOR INDEPENDENT NETWORK SLICES IN WIRELESS COMMUNICATION SYSTEM

CROSS-REFERENCE TO RELATED APPLICATIONS

This application is the National Stage filing under 35 U.S.C. 371 of International Application No. PCT/KR2019/013838, filed on Oct. 21, 2019, which claims the benefit of earlier filing date and right of priority to Korean Application No. 10-2018-0125000, filed on Oct. 19, 2018, the contents of which are all hereby incorporated by reference herein in their entirety.

TECHNICAL FIELD

The present disclosure relates to a communication system and method, in a system providing mobile communication services to terminals, in which the system supports a plurality of network slices, and if the use of some of the network slices is only authorized in a specific application group, the use of resources of the network slices by applications for which the use of the network slices is not authorized is effectively prevented, thus satisfying user experience and needs of the specific network slices.

BACKGROUND ART

Wireless communication systems are widely deployed to provide various types of communication services, such as voice and data. In general, a wireless communication system is a multi-access system capable of supporting communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, a multi-carrier frequency division multiple access (MC-FDMA) system, and so on.

Machine-to-machine (M2M) communication, and various devices and technologies, such as a smartphone, and a tablet PC that require a high data transfer rate, appear and supplied. Accordingly, the amount of data that needs to be processed in a cellular network is rapidly increasing. In order to satisfy the data throughput that rapidly increases as described above, a carrier aggregation technology for efficiently using a more frequency band, a cognitive radio technology, a multi-antenna technology for increasing the capacity of data transmitted within a limited frequency, a multi-BS cooperation technology, etc. are developed.

Meanwhile, a communication environment is advanced in a way that the density of nodes capable of being accessed by a user equipment (UE) nearby is increased. The node refers to a fixed point that includes one or more antennas and can transmit/receive a radio signal to the UE. A communication system having a high density of nodes may provide a UE with communication service having higher performance through cooperation between nodes.

DETAILED DESCRIPTION OF INVENTION

Technical Problem

An object of the present disclosure is to propose a method of supporting data transmission separated for each independent network slice in a wireless communication system.

Technical problems to be achieved by the present disclosure are not limited to the aforementioned technical problems, and other technical problems not described above may be evidently understood by those of ordinary skill in the art to which the present disclosure belongs from the following description.

Technical Solution

An aspect of the present disclosure, in a method of supporting data transmission by a base station in a wireless communication system, includes transmitting first multiplexing information to a terminal; and receiving a data block generated in the terminal based on the first multiplexing information, wherein the first multiplexing information may include information on a logical channel related to multiplexing in the base station.

In addition, the first multiplexing information may further include information on a group consisting of a logical channel in which multiplexing is allowed in the base station.

In addition, the first multiplexing information may further include information on a logical channel in which multiplexing is prohibited in the base station.

In addition, the first multiplexing information may further include a radio resource allocation identifier related to a logical channel in which multiplexing is allowed in the base station.

In addition, the method may further include receiving second multiplexing information from a core network node, wherein the second multiplexing information may include information related to a PDU session or network slice in which multiplexing is allowed in the base station.

In addition, the first multiplexing information may further include information related to the second multiplexing information based on the second multiplexing information received.

In addition, the data block may be generated in the terminal based on a priority of the logical channel.

Another aspect of the present disclosure, in a base station supporting data transmission in a wireless communication system, includes a transceiver; a memory; and a processor configured to control the transceiver and the memory, wherein the transceiver is configured to transmit first multiplexing information to a terminal, and receive a data block generated in the terminal based on the first multiplexing information, wherein the first multiplexing information may include information on a logical channel related to multiplexing in the base station.

Advantageous Effects

According to an embodiment of the present disclosure, in a wireless network supporting different types of network slices, security is strengthened so that the use of radio resources is not duplicated between different slices, so that it is flexible in a congestion situation or a security attack situation.

The effects obtained in the present disclosure are not limited to the above-mentioned effects, and other effects not mentioned will be clearly understood by those of ordinary skill in the art to which the present disclosure belongs from the following description.

DESCRIPTION OF DRAWINGS

FIG. 1 illustrates an AI apparatus according to an embodiment of the present disclosure.

FIG. 2 illustrates an AI server according to an embodiment of the present disclosure.

FIG. 3 illustrates an AI system according to an embodiment of the present disclosure.

FIG. 4 is a diagram illustrating schematic architecture of an evolved packet system (EPS) including an evolved packet core (EPC).

FIG. 5 illustrates an example of a network structure of an evolved universal terrestrial radio access network (E-UTRAN) to which the present disclosure may be applied.

FIG. 6 is an exemplary diagram illustrating architecture of a general E-UTRAN and EPC.

FIG. 7 is an exemplary diagram illustrating a structure of a radio interface protocol in a control plane between a UE and an eNB.

FIG. 8 is an exemplary diagram illustrating a structure of a radio interface protocol in a user plane between a UE and an eNB.

FIG. 9 is a diagram illustrating architecture of a general NR-RAN.

FIG. 10 is an exemplary diagram illustrating functional separation between a general NG-RAN and 5GC.

FIG. 11 illustrates an exemplary diagram of a general 5G architecture.

FIG. 12 is an example of a network slicing concept to which the present disclosure may be applied.

FIG. 13 is an embodiment to which the present disclosure may be applied.

FIG. 14 is an embodiment of a base station to which the present disclosure may be applied.

FIG. 15 illustrates a block diagram of a communication device according to an embodiment of the present disclosure.

FIG. 16 illustrates a block diagram of a communication device according to an embodiment of the present disclosure.

The accompanying drawings, which are included herein as a part of the description to help understanding the present disclosure, provide embodiments of the present disclosure and describe the technical features of the present disclosure with the description below.

BEST MODE FOR INVENTION

Terms used in the present disclosure are common terms currently and widely used by taking into consideration functions in the present disclosure, but the terms may be changed depending on an intention of a technician skilled in the art, a precedent, or the advent of a new technology. Furthermore, in a specific case, some terms are randomly selected by the applicant. In this case, the meaning of a corresponding term will be described in detail in the corresponding description of the disclosure. Accordingly, terms used in the present disclosure should be defined based on their substantial meanings and contents over the present disclosure, not the simple names of the terms.

The following embodiments are the results of combining the elements and characteristics of the present disclosure in a specific form. Each of the elements or characteristics may be considered to be optional unless separately explicitly described otherwise. Each of the elements or characteristics may be implemented in a form not combined with another element or characteristic. Furthermore, some elements and/or characteristics may be combined to form an embodiment of the present disclosure. The sequence of the operations described in the embodiments of the present disclosure may be changed. Some elements or characteristics of a specific embodiment may be included in another embodiment or may be substituted with the corresponding elements or characteristics of another embodiment.

In the description of the drawings, a procedure or step that may make the gist of the present disclosure vague has not been described and a procedure or step that may be understood by those skilled in the art has not been described.

In the entire specification, when it is said that a part "comprises or includes" any element, it means that the part does not exclude any element, but may further include another element unless explicitly described to the contrary. Furthermore, the term " . . . unit", "er (or)" or "module" described in the specification means a unit for processing at least one function or operation, and the unit may be implemented by hardware or software or a combination of hardware and software. Furthermore, "a or an", "one", "the" and similar words thereof may be used as a meaning including both singular and plural forms unless they are differently indicated in this specification or are evidently contracted in the context that describes the present disclosure (in particular, in the context of the claims).

Embodiments of the present disclosure may be supported by standard documents disclosed in at least one of the IEEE 802.xx system, the 3GPP system, the 3GPP LTE system, and the 3GPP2 system, that is, radio access systems. That is, evident steps or portions not described among the embodiments of the present disclosure may be described with reference to the documents.

Furthermore, all the terms disclosed in the present disclosure may be described by the standard documents. For example, the present disclosure may be incorporate by reference to one or more of standard documents, such as 3GPP TS 36.211, 3GPP TS 36.213, 3GPP TS 36.321, 3GPP TS 36.322, 3GPP TS 36.323, 3GPP TS 36.331, 3GPP TS 23.203, 3GPP TS 23.401, 3GPP TS 24.301, 3GPP TS 23.228, 3GPP TS 29.228, 3GPP TS 23.218, 3GPP TS 22.011, and 3GPP TS 36.413.

Hereinafter, preferred embodiments according to the present disclosure are described in detail with reference to the accompanying drawings. A detailed description to be disclosed along with the accompanying drawings is to describe an exemplary form of the present disclosure and is not intended to describe a unique embodiment of the present disclosure.

Furthermore, specific terms used in embodiments of the present disclosure are provided to help understanding of the present disclosure. The use of such a specific term may be changed into another form without departing from the technical spirit of the present disclosure.

A base station in this document is regarded as a terminal node of a network, which performs communication directly with a UE. In this document, particular operations regarded to be performed by the base station may be performed by an upper node of the base station depending on situations. In other words, it is apparent that in a network consisting of a plurality of network nodes including a base station, various operations performed for communication with a UE may be performed by the base station or by network nodes other than the base station. The term Base Station (BS) may be replaced with a fixed station, Node B, evolved-NodeB (eNB), Base Transceiver System (BTS), or Access Point (AP). Also, a terminal may be fixed or mobile; and the term may be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter may be part of the base station, and a receiver may be part of the terminal. Similarly, in uplink transmission, a transmitter may be part of the terminal, and a receiver may be part of the base station.

3GPP LTE/LTE-A/NR is primarily described for clear description, but technical features of the present disclosure are not limited thereto.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

The present disclosure described below can be implemented by combining or modifying respective embodiments to meet the above-described requirements of 5G.

The following describes in detail technical fields to which the present disclosure described below is applicable.

<Artificial Intelligence (AI)>

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given.

Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

<Robot>

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

<Self-Driving (Autonomous-Driving)>

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

<Extended Reality (XR)>

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 1 illustrates an AI device 100 according to an embodiment of the present disclosure.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the terminal 100 may include a communication unit 110, an input unit 120, a learning processor 130, a sensing unit 140, an output unit 150, a memory 170 and a processor 180.

The communication unit 110 may transmit and receive data to and from external devices, such as other AI devices 100a to 100er or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™ radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 180 may control at least some of the elements of the AI device 100 in order to execute an application program stored in the memory 170. Moreover, the processor 180 may combine and drive two or more of the elements included in the AI device 100 in order to execute the application program.

FIG. 2 illustrates an AI server 200 according to an embodiment of the present disclosure.

Referring to FIG. 2, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, a memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

FIG. 3 illustrates an AI system 1 according to an embodiment of the present disclosure.

Referring to FIG. 3, the AI system 1 is connected to at least one of the AI server 200, a robot 100a, a self-driving vehicle 100b, an XR device 100c, a smartphone 100d or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100a to 100e (200) configuring the AI system 1 may be interconnected over the cloud network 10. Particularly, the devices 100a to 100e and 200 may communicate with each other through a base station, but may directly communicate with each other without the intervention of a base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that is, AI devices configuring the AI system 1, over the cloud network 10, and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model, and may generate a response or control command based on the deduced result value.

Hereinafter, various embodiments of the AI devices 100a to 100e to which the above-described technology is applied are described. In this case, the AI devices 100a to 100e shown in FIG. 3 may be considered to be detailed embodiments of the AI device 100 shown in FIG. 1.

<AI+Robot>

An AI technology is applied to the robot 100a, and the robot 100a may be implemented as a guidance robot, a transport robot, a cleaning robot, a wearable robot, an entertainment robot, a pet robot, an unmanned flight robot, etc.

The robot 100a may include a robot control module for controlling an operation. The robot control module may mean a software module or a chip in which a software module has been implemented using hardware.

The robot 100a may obtain state information of the robot 100a, may detect (recognize) a surrounding environment and object, may generate map data, may determine a moving path and a running plan, may determine a response to a user interaction, or may determine an operation using sensor information obtained from various types of sensors.

In this case, the robot 100a may use sensor information obtained by at least one sensor among LIDAR, a radar, and a camera in order to determine the moving path and running plan.

The robot 100a may perform the above operations using a learning model configured with at least one artificial neural network. For example, the robot 100a may recognize a surrounding environment and object using a learning model, and may determine an operation using recognized surrounding environment information or object information. In this case, the learning model may have been directly trained in the robot 100a or may have been trained in an external device, such as the AI server 200.

In this case, the robot 100a may directly generate results using the learning model and perform an operation, but may perform an operation by transmitting sensor information to an external device, such as the AI server 200, and receiving results generated in response thereto.

The robot 100a may determine a moving path and running plan using at least one of map data, object information detected from sensor information, or object information obtained from an external device. The robot 100a may run along the determined moving path and running plan by controlling the driving unit.

The map data may include object identification information for various objects disposed in the space in which the robot 100a moves. For example, the map data may include object identification information for fixed objects, such as a wall and a door, and movable objects, such as a flowport and a desk. Furthermore, the object identification information may include a name, a type, a distance, a location, etc.

Furthermore, the robot 100*a* may perform an operation or run by controlling the driving unit based on a user's control/interaction. In this case, the robot 100*a* may obtain intention information of an interaction according to a user's behavior or voice speaking, may determine a response based on the obtained intention information, and may perform an operation.

<AI+Self-Driving>

An AI technology is applied to the self-driving vehicle 100*b*, and the self-driving vehicle 100*b* may be implemented as a movable type robot, a vehicle, an unmanned flight body, etc.

The self-driving vehicle 100*b* may include a self-driving control module for controlling a self-driving function. The self-driving control module may mean a software module or a chip in which a software module has been implemented using hardware. The self-driving control module may be included in the self-driving vehicle 100*b* as an element of the self-driving vehicle 100*b*, but may be configured as separate hardware outside the self-driving vehicle 100*b* and connected to the self-driving vehicle 100*b*.

The self-driving vehicle 100*b* may obtain state information of the self-driving vehicle 100*b*, may detect (recognize) a surrounding environment and object, may generate map data, may determine a moving path and running plan, or may determine an operation using sensor information obtained from various types of sensors.

In this case, in order to determine the moving path and running plan, like the robot 100*a*, the self-driving vehicle 100*b* may use sensor information obtained from at least one sensor among LIDAR, a radar and a camera. [139] Particularly, the self-driving vehicle 100*b* may recognize an environment or object in an area whose view is blocked or an area of a given distance or more by receiving sensor information for the environment or object from external devices, or may directly receive recognized information for the environment or object from external devices.

The self-driving vehicle 100*b* may perform the above operations using a learning model configured with at least one artificial neural network. For example, the self-driving vehicle 100*b* may recognize a surrounding environment and object using a learning model, and may determine the flow of running using recognized surrounding environment information or object information. In this case, the learning model may have been directly trained in the self-driving vehicle 100*b* or may have been trained in an external device, such as the AI server 200.

In this case, the self-driving vehicle 100*b* may directly generate results using the learning model and perform an operation, but may perform an operation by transmitting sensor information to an external device, such as the AI server 200, and receiving results generated in response thereto.

The self-driving vehicle 100*b* may determine a moving path and running plan using at least one of map data, object information detected from sensor information or object information obtained from an external device. The self-driving vehicle 100*b* may run based on the determined moving path and running plan by controlling the driving unit.

The map data may include object identification information for various objects disposed in the space (e.g., road) in which the self-driving vehicle 100*b* runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100*b* may perform an operation or may run by controlling the driving unit based on a user's control/interaction. In this case, the self-driving vehicle 100*b* may obtain intention information of an interaction according to a user' behavior or voice speaking, may determine a response based on the obtained intention information, and may perform an operation.

<AI+XR>

An AI technology is applied to the XR device 100*c*, and the XR device 100*c* may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100*c* may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100*c* may output an XR object, including additional information for a recognized object, by making the XR object correspond to the corresponding recognized object.

The XR device 100*c* may perform the above operations using a learning model configured with at least one artificial neural network. For example, the XR device 100*c* may recognize a real object in three-dimensional point cloud data or image data using a learning model, and may provide information corresponding to the recognized real object. In this case, the learning model may have been directly trained in the XR device 100*c* or may have been trained in an external device, such as the AI server 200.

In this case, the XR device 100*c* may directly generate results using a learning model and perform an operation, but may perform an operation by transmitting sensor information to an external device, such as the AI server 200, and receiving results generated in response thereto.

<AI+Robot+Self-Driving>

An AI technology and a self-driving technology are applied to the robot 100*a*, and the robot 100*a* may be implemented as a guidance robot, a transport robot, a cleaning robot, a wearable robot, an entertainment robot, a pet robot, an unmanned flight robot, etc.

The robot 100*a* to which the AI technology and the self-driving technology have been applied may mean a robot itself having a self-driving function or may mean the robot 100*a* interacting with the self-driving vehicle 100*b*.

The robot 100*a* having the self-driving function may collectively refer to devices that autonomously move along a given flow without control of a user or autonomously determine a flow and move.

The robot 100*a* and the self-driving vehicle 100*b* having the self-driving function may use a common sensing method in order to determine one or more of a moving path or a running plan. For example, the robot 100*a* and the self-driving vehicle 100*b* having the self-driving function may determine one or more of a moving path or a running plan using information sensed through LIDAR, a radar, a camera, etc.

The robot 100*a* interacting with the self-driving vehicle 100*b* is present separately from the self-driving vehicle 100*b*, and may perform an operation associated with a self-driving function inside or outside the self-driving vehicle 100*b* or associated with a user got in the self-driving vehicle 100*b*.

In this case, the robot 100*a* interacting with the self-driving vehicle 100*b* may control or assist the self-driving function of the self-driving vehicle 100*b* by obtaining sensor information in place of the self-driving vehicle 100*b* and providing the sensor information to the self-driving vehicle 100*b*, or by obtaining sensor information, generating surrounding environment information or object information, and providing the surrounding environment information or object information to the self-driving vehicle 100*b*.

Alternatively, the robot 100*a* interacting with the self-driving vehicle 100*b* may control the function of the self-driving vehicle 100*b* by monitoring a user got in the self-driving vehicle 100*b* or through an interaction with a user. For example, if a driver is determined to be a drowsiness state, the robot 100*a* may activate the self-driving function of the self-driving vehicle 100*b* or assist control of the driving unit of the self-driving vehicle 100*b*. In this case, the function of the self-driving vehicle 100*b* controlled by the robot 100*a* may include a function provided by a navigation system or audio system provided within the self-driving vehicle 100*b*, in addition to a self-driving function simply.

Alternatively, the robot 100*a* interacting with the self-driving vehicle 100*b* may provide information to the self-driving vehicle 100*b* or may assist a function outside the self-driving vehicle 100*b*. For example, the robot 100*a* may provide the self-driving vehicle 100*b* with traffic information, including signal information, as in a smart traffic light, and may automatically connect an electric charger to a filling inlet through an interaction with the self-driving vehicle 100*b* as in the automatic electric charger of an electric vehicle.

<AI+Robot+XR>

An AI technology and an XR technology are applied to the robot 100*a*, and the robot 100*a* may be implemented as a guidance robot, a transport robot, a cleaning robot, a wearable robot, an entertainment robot, a pet robot, an unmanned flight robot, a drone, etc.

The robot 100*a* to which the XR technology has been applied may mean a robot, that is, a target of control/interaction within an XR image. In this case, the robot 100*a* is different from the XR device 100*c*, and they may operate in conjunction with each other.

When the robot 100*a*, that is, a target of control/interaction within an XR image, obtains sensor information from sensors including a camera, the robot 100*a* or the XR device 100*c* may generate an XR image based on the sensor information, and the XR device 100*c* may output the generated XR image. Furthermore, the robot 100*a* may operate based on a control signal received through the XR device 100*c* or a user's interaction.

For example, a user may identify a corresponding XR image at timing of the robot 100*a*, remotely operating in conjunction through an external device, such as the XR device 100*c*, may adjust the self-driving path of the robot 100*a* through an interaction, may control an operation or driving, or may identify information of a surrounding object.

<AI+Self-Driving+XR>

An AI technology and an XR technology are applied to the self-driving vehicle 100*b*, and the self-driving vehicle 100*b* may be implemented as a movable type robot, a vehicle, an unmanned flight body, etc.

The self-driving vehicle 100*b* to which the XR technology has been applied may mean a self-driving vehicle equipped with means for providing an XR image or a self-driving vehicle, that is, a target of control/interaction within an XR image. Particularly, the self-driving vehicle 100*b*, that is, a target of control/interaction within an XR image, is different from the XR device 100*c*, and they may operate in conjunction with each other.

The self-driving vehicle 100*b* equipped with the means for providing an XR image may obtain sensor information from sensors including a camera, and may output an XR image generated based on the obtained sensor information. For example, the self-driving vehicle 100*b* includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100*b*, at least some of the XR object may be output so that it overlaps an object within a screen. For example, the self-driving vehicle 100*b* may output XR objects corresponding to objects, such as a carriageway, another vehicle, a traffic light, a signpost, a two-wheeled vehicle, a pedestrian, and a building.

When the self-driving vehicle 100*b*, that is, a target of control/interaction within an XR image, obtains sensor information from sensors including a camera, the self-driving vehicle 100*b* or the XR device 100*c* may generate an XR image based on the sensor information. The XR device 100*c* may output the generated XR image. Furthermore, the self-driving vehicle 100*b* may operate based on a control signal received through an external device, such as the XR device 100*c*, or a user's interaction.

First, terms used in the present disclosure are defined as follows.

IP multimedia subsystem or IP multimedia core network subsystem (IMS): an architectural framework for standardizing and providing voice or another multimedia service on an IP.

Universal mobile telecommunications system (UMTS): a third generation mobile communication technology based on a global system for mobile communication (GSM), developed by 3GPP.

Evolved packet system (EPS): a network system composed of access networks, such as an evolved packet core (EPC) and LTE/UTRAN, that is, a packet switched (PS) core network based on an Internet protocol (IP). This is a network having an improved form of the UMTS.

NodeB: a base station of a GERAN/UTRAN. This is installed outdoors and has coverage of a macro cell scale.

eNodeB/eNB: a base station of an E-UTRAN. This is installed outdoors and has coverage of a macro cell scale.

User equipment (UE): a user equipment. The UE may be referred to as a term, such as a user terminal (UT), a mobile equipment (ME), or a mobile station (MS). Furthermore, the UE may be a portable device, such as a notebook, a mobile phone, a personal digital assistant (PDA), a smartphone, or a multimedia device, or may be a device which cannot be carried, such as a personal computer (PC) or a vehicle mounting device. In MTC-related contents, a UE or a term, such as a UE, may refer to an MTC device.

Home nodeB (HNB): a base station of a UMTS network. This is installed outdoors and has coverage of a micro-cell scale.

Home eNodeB (HeNB): a base station of an EPS network. This is installed indoors and has coverage of a micro-cell scale Mobility management entity (MME): a network node of an EPS network which performs mobility management (MM) and session management (SM) functions.

Packet data network-gateway (PDN-GW)/PGW/P-GW: network nodes of an EPS network which perform UE IP address assignment, packet screening and filtering, an charging data collection functions.

Serving gateway (SGW)/S-GW: network nodes of an EPS network which perform mobility anchor, packet routing, idle state packet buffering, and a function of triggering, by an MME, a UE for paging.

Policy and charging rule function (PCRF): a network node of an EPS network which performs a policy decision for dynamically applying differentiated QoS for each service flow and a charging policy.

Open mobile alliance device management (OMA DM): a protocol designed for the management of mobile devices, such as a handheld phone, a PDA, and a portable computer. The protocol performs functions, such as device configuration, firmware upgrade, and error reports.

Operation administration and maintenance (OAM): a network management function group that provides network defect display, performance information, and data and diagnosis functions.

Non-access stratum (NAS): an upper stratum of a control plane between a UE and an MME: this is a function layer for exchanging signaling or traffic messages between a UE and a core network in the LTE/UMTS protocol stack, supports the mobility of the UE and supports a session management procedure for establishing and maintaining an IP connection between a UE and a PDN GW, an IP address management, etc.

EPS mobility management (EMM): a sub-layer of the NAS layer. The EMM may be in an "EMM-Registered" or "EMM-Deregistered" state depending on whether a UE is attached to a network or detached from a network.

EMM connection management (ECM) connection: a signaling connection for the exchanged of NAS messages, established between a UE and the MME. The ECM connection is a logical connection composed of an RRC connection between a UE and an eNB and an S1 signaling connection between an eNB and an MME. When an ECM connection is established/terminate, RRC and S1 signaling connections are likewise established/terminated. An established ECM connection means, to a UE, that it has an RRC connection established with an eNB, and means, to an MME, that it has an S1 signaling connection established with the eNB. ECM may have an "ECM-Connected" or "ECM-Idle" state depending on whether an NAS signaling connection, that is, an ECM connection is established.

Access stratum (AS): this includes a protocol stack between a UE and a radio (or access) network, and is responsible for data and network control signal transmission, etc.

NAS configuration management object (MO): a management object (MO) used in a process of configuring, in a UE, a parameter associated with an NAS functionality.

Packet data network (PDN): a network where server (e.g., a multimedia messaging service (MMS) server, or a wireless application protocol (WAP) server) supporting a specific service is located.

PDN connection: a logical connection between a UE and a PDN represented as one IP address (one IPv4 address and/or one IPv6 prefix).

Access point name (APN): a text string that denotes or classifies a PDN. In order to access a requested service or network, a specific P-GW is used. The APN means a name (text string) predefined within the network so that a P-GW can be found (e.g., internet.mnc012.mcc345.gprs)

Radio access network (RAN): a unit including a NodeB, an eNodeB, and a radio network controller (RNC) controlling the NodeB and the eNodeB in a 3GPP network. The RAN is present between UEs, and provides a connection to a core network.

Home location register (HLR)/home subscriber server (HSS): a database having subscriber information within a 3GPP network. The HSS may perform functions, such as configuration storage, identity management, and user status storage.

Public land mobile network (PLMN): a network configured for the purpose of providing mobile communication services to persons. The PLMN may be classified and configured for each operator.

Access network discovery and selection function (ANDSF): one network entity that provides a policy so that access available for a UE is discovered and selected in an operator unit.

EPC path (or infrastructure data path): a user plane communication path through the EPC E-UTRAN radio access bearer (E-RAB): this refers to concatenation between an S1 bearer and a corresponding data radio bearer. When the E-RAB is present, one-to-one mapping is present between the E-RAB and an EPS bearer of the NAS.

GPRS tunneling protocol (GTP): a group of IP-based communications protocols used to carry general packet radio service (GPRS) within the GSM, the UMTS and LTE networks. GTP and proxy mobile IPv6-based interfaces are specified on various interface points within 3GPP architecture. The GTP may be decomposed into some protocols (e.g., GTP-C, GTP-U and GTP'). The GTP-C is used within a GPRS core network for signaling between gateway GPRS support nodes (GGSN) and serving GPRS support nodes (SGSN). The GTP-C permits the activation (e.g., PDN context activation) of a session for an SGSN user, the deactivation of the same session, the adjustment of quality of service parameters or the update of a session for a subscriber that just operates from another SGSN. The GTP-U is used to carry user data within the GPRS core network and between a radio access network and a core network. FIG. 1 is a diagram illustrating schematic architecture of an evolved packet system (EPS) including an evolved packet core (EPC).

Cell as a radio resource: A 3GPP LTE/LTE-A system uses the concept of a cell in order to manage radio resources. A cell associated with a radio resource is different from a cell of a geographical region. The "cell" associated with a radio resource is defined as a combination of downlink (DL) resources and uplink (UL) resources, that is, a combination of a DL carrier and an UL carrier. A cell may be configured with a DL resource solely or a combination of a DL resource and an UL resource. If a carrier aggregation is supported, linkage between a carrier frequency of a DL resource and a carrier frequency of an UL resource may be indicated by system information. In this case, the carrier frequency means a center frequency of each cell or carrier. In particular, a cell operating on a primary frequency is referred to as a primary cell (Pcell), and a cell operating on a secondary frequency is referred to as a secondary cell (Scell). The Scell means a cell which may be configured after radio resource control (RRC) connection establishment is performed and may be used to provide additional radio resources. Depending on the capabilities of a UE, an Scell, together with a Pcell, may form a set of serving cells for a UE. In the case of a UE which is in the RRC_CONNECTED state, but has a carrier aggregation not configured therein or does not support a carrier aggregation, only one serving cell configured as only a Pcell is present. Meanwhile, the "cell" of a geographical region may be understood as coverage where a node can provide services using a carrier. The "cell" of a radio resource is associated with a bandwidth (BW), that is, a frequency range configured by a carrier. Downlink coverage, that is, a range in which a node may transmit a valid signal, and uplink coverage, that is, a range in which a node may receive a valid signal from a UE, depend on a carrier that carries the corresponding signal. The coverage of the node is associated with coverage of a "cell" of a radio resource used by the node. Accordingly, the term "cell" may be used to mean coverage of service by a node, a radio resource, or a range which may be reached by a signal using a radio resource with valid intensity.

The EPC is a core element of system architecture evolution (SAE) for improving performance of 3GPP technologies. The SAE corresponds to a research object that determines a network structure for supporting mobility between various types of networks. The SAE has an object of providing an optimized packet-based system that supports various radio access technologies based on an IP, for example, IP, and provides further improved data transmission capabilities.

Specifically, the EPC is a core network of an IP mobile communication system for a 3GPP LTE system, and may support packet-based real-time and non-real-time service. In the existing mobile communication system (i.e., second generation or third generation mobile communication system), a function of the core network has been implemented through different two sub-domains of circuit-switched (CS) for voice and packet-switched (PS) for data. However, in the 3GPP LTE system, that is, an evolution of the third generation mobile communication system, the sub-domains of the CS and the PS have been unified into one IP domain. That is, in the 3GPP LTE system, a connection between UEs having IP capabilities may be established through an TO-based base station (e.g., evolved Node B (eNodeB)), the EPC, and an application domain (e.g., IP multimedia subsystem (IMS)). That is, the EPC is a structure essential for an end-to-end IP service implementation.

The EPC may include various components. FIG. 1 illustrates a serving gateway (SGW), a packet data network gateway (PDN GW), a mobility management entity (MME), a serving general packet radio service (GPRS) supporting node (SGSN), and an enhanced packet data gateway (ePDG), that is, some of the various components.

The SGW (or S-GW) operates as a boundary point between a radio access network (RAN) and a core network, and is an element having a function for maintaining a data path between an eNB and the PDN GW. Furthermore, if a UE moves over a region served by an eNB, the SGW acts as a local mobility anchor point. That is, for mobility within the E-UTRAN (within an evolved-universal mobile telecommunications system (UMTS) terrestrial radio access network defined after 3GPP release-8), packets may be routed through the SGW. Furthermore, the SGW may function as an anchor point for mobility with another 3GPP network (a RAN defined prior to 3GPP release-8, for example, a UTRAN or a global system for mobile communication (GSM) (GERAN)/enhanced data rates for global evolution (EDGE) radio access network).

The PDN GW (or P-GW) corresponds to a termination point of a data interface toward a packet data network. The PDN GW may support policy enforcement features, packet filtering, charging support, etc. Furthermore, the PDN GW (or P-GW) may function as an anchor point for mobility management with a 3GPP network and non-3GPP networks (e.g., an untrusted network such as an I-interworking wireless local area network (WLAN) and a trusted network such as a code division multiple access (CDMA) network or WiMax).

The example of a network structure of FIG. 4 illustrates that the SGW and the PDN GW are configured as separate gateways, but the two gateways may be implemented according to a single gateway configuration option.

The MME is an element that performs access to a network connection of a UE and signaling and control functions for supporting the assignment, tracking, paging, roaming, handover, etc. of network resources. The MME controls control plane functions related to subscriber and session management. The MME manages many eNBs and performs signaling for selecting a conventional gateway for handover for another 2G/3G network. Furthermore, the MME performs functions, such as security procedures, terminal-to-network session handling, and idle terminal location management.

The SGSN handles all packet data, such as the mobility management and authentication of a user for another 3GPP network (e.g., GPRS network).

The ePDG acts as a security node for an untrusted non-3GPP network (e.g., I-WLAN, WiFi hotspot).

As described with reference to FIG. 4, a UE having an IP capability may access an IP service network (e.g., IMS) provided by a service provider (i.e., operator) via various elements within the EPC based on non-3GPP access in addition to 3GPP access.

Furthermore, FIG. 4 illustrates various reference points (e.g., S1-U and S1-MME). In the 3GPP system, a conceptual link that connects two functions present in different function entities of the E-UTRAN and the EPC is defined as a reference point. Table 1 lists reference points illustrated in FIG. 4. In the examples of Table 1, various reference points may be present depending on a network structure.

TABLE 1

| Reference point | Description |
| --- | --- |
| S1-MME | Reference point for the control plane protocol between E-UTRAN and MME) |

TABLE 1-continued

| Reference point | Description |
|---|---|
| S1-U | Reference point between E-UTRAN and Serving GW for the per bearer the user plane tunneling and inter eNodeB path switching during handover |
| S3 | It enables user and bearer information exchange for inter 3GPP access network mobility in idle and/or active state. This reference point can be used intra-PLMN or inter-PLMN (e.g., in the case of Inter-PLMN HO) |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to the UE mobility and if Serving GW needs to connect to a non-collocated the PDN GW for the required the PDN connectivity. |
| S11 | Reference point for control plane protocol between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

S2a and S2b among the reference point illustrated in FIG. 4 correspond to non-3GPP interfaces. S2a is a reference point that provides the user plane with related control and mobility support between trusted non-3GPP access and the PDN GW. S2b is a reference point that provides the user plane with related control and mobility support between an ePDG and the PDN GW.

FIG. 5 illustrates an example of a network structure of an evolved universal terrestrial radio access network (E-UTRAN) to which the present disclosure may be applied.

The E-UTRAN system is an evolved system from the existing UTRAN system, and may be, for example, a 3GPP LTE/LTE-A system. Communication networks are widely placed to provide various communication services such as voice (e.g. voice over internet protocol (VoIP)) via IMS and packet data.

Referring to FIG. 4, an E-UMTS network includes an E-UTRAN, an EPC, and one or more UEs. The E-UTRAN is composed of eNBs that provide a control plane and a user plane protocol to the UE, and the eNBs are connected through an X2 interface.

An X2 user plane interface (X2-U) is defined between the eNBs. The X2-U interface provides non-guaranteed delivery of a user plane packet data unit (PDU). An X2 control plane interface (X2-CP) is defined between two neighboring eNBs. The X2-CP performs functions such as context delivery between eNBs, control of a user plane tunnel between a source eNB and a target eNB, delivery of handover-related messages, and uplink load management.

The eNB is connected to the terminal through a radio interface and to an evolved packet core (EPC) through an S1 interface.

An S1 user plane interface (S1-U) is defined between the eNB and the serving gateway (S-GW). An S1 control plane interface (S1-MME) is defined between the eNB and the mobility management entity (MME). The S1 interface performs an evolved packet system (EPS) bearer service management function, a non-access stratum (NAS) signaling transport function, network sharing, and an MME load balancing function. The S1 interface supports many-to-many-relation between the eNB and an MME/S-GW.

The MME can perform various functions, such as NAS signaling security, access stratum (AS) security control, core network (CN) inter-node (Inter-CN) signaling to support mobility between 3GPP access networks, idle mode UE reachability (including performance and control of paging retransmission), tracking area identity (TAI) management (for idle and active mode terminals), PDN GW and SGW selection, MME selection for handover in which MME is changed, SGSN selection for handover to 2G or 3G 3GPP access network, roaming, authentication, bearer management functions including dedicated bearer establishment, and supporting the transmission of public warning system (PWS) (including earthquake and tsunami warning system (ETWS) and commercial mobile alert system (CMAS)) messages.

FIG. 6 is an exemplary diagram illustrating architecture of a general E-UTRAN and EPC.

As shown, the eNB may perform functions for routing to the gateway while the Radio Resource Control (RRC) connection is active, scheduling and transmitting of paging messages, scheduling and transmitting of broadcasting channel (BCH), dynamic allocation of resources in the uplink and downlink to the UE, configuration and provision for measurement of the eNB, radio bearer control, radio admission control, and connection mobility control. In the EPC, paging generation, LTE IDLE state management, ciphering of the user plane, SAE bearer control, ciphering of NAS signaling and integrity protection functions may be performed.

FIG. 7 is an exemplary diagram illustrating a structure of a radio interface protocol in a control plane between a UE and an eNB, and FIG. 8 is an exemplary diagram illustrating the structure of a radio interface protocol in a user plane between a UE and an eNB.

The radio interface protocol is based on a 3GPP radio access network standard. The radio interface protocol is horizontally composed of a physical layer, a data link layer and a network layer, and is vertically divided into a user plane for data information transmission and a control plane for control signal delivery.

The protocol layers may be divided into an L1 (first layer), an L2 (second layer), and an L3 (third layer) based on the lower three layers of an open system interconnection (OSI) reference model widely known in a communication system.

In the following, each layer of the radio protocol of the control plane shown in FIG. 7 and the radio protocol of the user plane shown in FIG. 8 will be described.

The physical layer, that is, the first layer, provides information transfer service using a physical channel. The physical layer has been connected to a medium access control layer placed on the upper side through a transport channel. Data between the medium access control layer and the physical layer is transferred through the transport channel. Furthermore, data is transferred through a physical channel between different physical layers, that is, physical layers between the transmission side and the reception side.

The physical channel is composed of several subframes on a time axis and several subcarriers on a frequency axis. In this case, one subframe is composed of a plurality of OFDM symbols and a plurality of subcarriers on the time axis. One subframe is composed of a plurality of resource blocks. One resource block is composed of a plurality of OFDM symbols and a plurality of subcarriers. A transmission time interval (TTI), that is, a unit time during which data is transmitted, is 1 ms corresponding to 1 subframe.

The physical channels present in the physical layers on the transmission side and the reception side may be divided into a physical downlink shared channel (PDSCH) and a physical uplink shared channel (PUSCH), that is, data channels, and a physical downlink control channel (PDCCH), a physical control format indicator channel (PCFICH), a physical Hybrid-ARQ indicator channel (PHICH), and a physical uplink control channel (PUCCH), that is, control channels, according to 3GPP LTE.

Several layers are present in the second layer. First, the medium access control (MAC) layer of the second layer functions to map various logical channels to various transport channels, and also acts as logical channel multiplexing for mapping several logical channels to one transport channel. The MAC layer has been connected to a RLC layer, that is, an upper layer, through a logical channel. The logical channel is basically divided into a control channel that transmits information of the control plane and a traffic channel that transmits information of the user plane, depending on the type of transmitted information.

The radio link control (RLC) layer of the second layer functions to adjust the size of data, received from an upper layer, through segmentation and concatenation so that the data is suitable for a lower layer to transmit the data in a radio interval.

The packet data convergence protocol (PDCP) layer of the second layer performs a header compression function for reducing the size of an IP packet header having a relatively large size and containing unnecessary control information in order to efficiently transmit the IP packet, such as IPv4 or IPv6, in a radio interval having a small bandwidth when transmitting the IP packet. Furthermore, in the LTE system, the PDCP layer also performs a security function, which is composed of ciphering for preventing third party data wiretapping and integrity protection for preventing a third party data manipulation.

The radio resource control (hereinafter abbreviated as an "RRC") layer located at the top of the third layer is defined in only the control plane, is related to a configuration, re-configuration and release of radio bearers (hereinafter abbreviated as "RB"), and is responsible for control of the logical channel, the transport channel and the physical channel. In this case, the RB means service provided by the second layer for data transfer between a UE and an E-UTRAN.

If an RRC connection is established between the RRC layer of a UE and the RRC layer of a radio network, the UE is in an RRC connected mode. If not, the UE is in an RRC idle state.

Hereinafter, the RRC state and RRC connection method of a UE is described. The RRC state means whether the RRC of the UE has been logically connected to the RRC of the E-UTRAN. A case where the RRC of the UE is connected to the RRC of the E-UTRAN is called the RRC_CONNECTED state. A case where the RRC of the UE is not connected to the RRC of the E-UTRAN is called the RRC_IDLE state. A UE in the RRC_CONNECTED state has an RRC connection, and thus an E-UTRAN may check the presence of the UE in a cell unit. Accordingly, the E-UTRAN may effectively control the UE. In contrast, an E-UTRAN cannot check the presence of a UE in the RRC_IDLE state. A core network manages the UE in a tracking area (TA) unit, that is, an area unit greater than a cell. That is, whether the UE in the RRC_IDLE state is present has only to be checked in an area unit greater than a cell. In order to receive common mobile communication service, such as voice or data, the corresponding UE needs to make a transition to the RRC_CONNECTED state. Each TA is identified based on a tracking area identity (TAI). A UE may configure a TAI through a tracking area code (TAC), that is, information broadcasted by a cell.

When a user first turns on a UE, the UE first searches for a proper cell, sets up an RRC connection with a corresponding cell, and registers its information with a core network. Thereafter, the UE stays in the RRC_IDLE state. The UE in the RRC_IDLE state (re)selects a cell, if necessary, and checks system information or paging information. This is called that the UE camps on the cell. When it is necessary to set up an RRC connection, the UE in the RRC_IDLE state establishes RRC and an RRC connection with an E-UTRAN through an RRC connection procedure and shifts to the RRC_CONNECTED state. A case where the UE in the RRC_IDLE state needs to set up an RRC connection includes several types. The types may include that the UE requires a call attempt, a data transmission attempt, etc. of a user or requires the transmission of a corresponding response message, etc. when receiving a paging message from the E-UTRAN, for example.

A non-access stratum (NAS) layer located over the RRC layer performs functions, such as session management and mobility management.

Below, the NAS layer shown in FIG. 7 will be described in detail.

An evolved session management (ESM) belonging to the NAS layer is responsible for control that enables a UE to use PS service from a network by performing functions, such as default bearer management and dedicated bearer management. A default bearer resource is characterized in that it is assigned by a specific packet data network (PDN) when the network is accessed upon first access to the network. In this case, the network assigns an IP address available for a UE so that the UE can use data service and assigns QoS of a default bearer. In LTE, two types of a bearer having a guaranteed bit rate (GBR) QoS characteristic that guarantees a specific bandwidth for data transmission/reception and a non-GBR bearer having the best effort QoS characteristic without guaranteeing a bandwidth are supported. In the case of a default bearer, a non-GBR bearer is assigned. In the case of a dedicated bearer, a bearer having a QoS characteristic of a GBR or non-GBR may be assigned.

A bearer assigned to a UE by a network is called an evolved packet service (EPS) bearer. When assigning the EPS bearer, the network assigns one ID. This is called an EPS bearer ID. One EPS bearer has QoS characteristics of a maximum bit rate (MBR) or/and a guaranteed bit rate (GBR).

FIG. 9 is a diagram illustrating architecture of a general NR-RAN.

Referring to FIG. 9, an NG-RAN node may be one of the following.

gNB providing NR user plane and control plane protocols towards the UE; or ng-eNB providing E-UTRA user plane and control plane protocols towards the UE.

The gNB and the ng-eNB are connected to each other through an Xn interface. In addition, the gNB and ng-eNB are connected to access and mobility management functions (AMF) through the NG interface to 5GC, in more detail, through the NG-C interface, and user plane functions (UPF) through the NG-U interface (See 3GPP TS 23.501 [3]).

For reference, the architecture and F1 interface for functional separation are defined in 3GPP TS 38.401 [4].

FIG. 10 is an exemplary diagram illustrating functional separation between a general NG-RAN and 5GC.

Referring to FIG. 10, yellow boxes represent logical nodes and white boxes represent main functions.

The gNB and ng-eNB host the following functions.

Radio resource management function: radio bearer control, radio approval control, access mobility control, dynamic resource allocation for UE in both uplink and downlink (scheduling)

IP header compression, encryption and data integrity protection;

If routing for the AMF cannot be determined from information provided by the UE, the AMF is selected from the attached file of IMT-2000 3GPP-UE;

Routing of user plane data to UPF;

Delivery of control plane information to the AMF;

Connection configuration and release;

Paging message scheduling and transmission

System broadcasting information scheduling and transmission (provided by the AMF or OAM)

Measurement and measurement report configuration for mobility and scheduling

Display of uplink transmission level packets

Session management;

Network slicing support;

QoS flow management and mapping for data radio bearers

Support of UE in RRC_INACTIVE state

NAS message distribution function;

Radio access network sharing;

Double connection;

Close linkage between NR and E-UTRA

The AMF hosts the following main functions (see 3GPP TS 23.501 [3]).

NAS signal termination;

NAS signal security;

AS security control;

Signal transmission between CN nodes for movement between 3GPP access networks;

Idle mode UE connectivity (including paging retransmission control and execution)

Registration area management;

Supports mobility within and between systems

Access authentication;

Granting access rights including checking roaming rights;

Mobility management control (subscription and policy)

Support for network slicing;

Select SMF

The UPF hosts the following main functions (see 3GPP TS 23.501 [3]).

Anchor points for Intra-/Inter-RAT mobility (if applicable)

External PDU session point interconnected to the data network

Packet routing & forwarding;

Packet inspection and user plane part of policy rule enforcement

Traffic usage report;

Uplink classifier to support the flow of traffic to the data network

A branch point for supporting multi-homed PDU sessions;

QoS processing for user plane (e.g. packet filtering, gate, UL/DL speed enforcement)

Uplink traffic verification (SDF and QoS flow mapping)

Downlink packet buffering and downlink data notification triggering

Session management function (SMF) hosts the following main functions (see 3GPP TS 23.501 [3]).

Session management;

UE IP address allocation and management

UP function selection and control;

Traffic steering configuration for routing traffic to appropriate destinations in the UPF Policy enforcement and partial control of QoS Downlink Data Notification FIG. 11 illustrates an exemplary diagram of a general 5G architecture. The following is a description of each reference interface and node in FIG. 11.

An access and mobility management function (AMF) supports functions of inter-CN node signaling for mobility between 3GPP access networks, termination of radio access network (RAN) CP interface N2, termination N1 of NAS signaling, registration management (registration area management), idle mode UE reachability, support of network slicing, SMF selection, and the like.

Some or all of the functions of the AMF can be supported in a single instance of one AMF.

A data network (DN) means, for example, operator services, internet access, or 3rd party service, etc. The DN transmits a downlink protocol data unit (PDU) to the UPF or receives the PDU transmitted from the UE from the UPF.

A policy control function (PCF) receives information about packet flow from an application server and provides functions of determining policies such as mobility management and session management.

A session management function (SMF) provides a session management function. If the UE has a plurality of sessions, the sessions can be respectively managed by different SMFs.

Some or all of the functions of the SMF can be supported in a single instance of one SMF.

A unified data management (UDM) stores subscription data of user, policy data, etc.

A user plane function (UPF) transmits the downlink PDU received from the DN to the UE via (R)AN and transmits the uplink PDU received from the UE to the DN via the (R)AN.

An application function (AF) interacts with 3GPP core network to provide services (e.g., to support functions of an application influence on traffic routing, network capability exposure access, interaction with policy framework for policy control, and the like).

A (radio) access network (R)AN collectively refers to a new radio access network supporting both evolved E-UTRA, that is an evolved version of 4G radio access technology, and a new radio (NR) access technology (e.g., gNB).

The gNB supports functions for radio resource management (i.e., radio bearer control, radio admission control, connection mobility control, and dynamic allocation of resources (i.e., scheduling) to the UE in uplink/downlink)

The UE means a user equipment.

In the 3GPP system, a conceptual link connecting between the NFs in a 5G system is defined as a reference point.

N1 is a reference point between the UE and the AMF, N2 is a reference point between the (R)AN and the AMF, N3 is a reference point between the (R)AN and the UPF, N4 is a reference point between the SMF and the UPF, N6 is a reference point between the UPF and the data network, N9 is a reference point between two core UPFs, N5 is a reference point between the PCF and the AF, N7 is a reference point between the SMF and the PCF, N24 is a reference point between the PCF in the visited network and the PCF in the home network, N8 is a reference point between the UDM and the AMF, N10 is a reference point between the UDM and the SMF, N11 is a reference point between the AMF and the SMF, N12 is a reference point between the AMF and an authentication server function (AUSF), N13 is a reference point between the UDM and the AUSF, N14 is a reference point between two AMFs, N15 is a reference point between the PCF and the AMF in case of non-roaming scenario, reference point between the PCF in the visited network and the AMF in case of roaming scenario, N16 is a reference point between two SMFs (reference point between the SMF in the visited network and the SMF in the home network in case of roaming scenario), N17 is a reference point between the AMF and 5G-equipment identity register (EIR), N18 is a reference point between the AMF and an unstructured data storage function (UDSF), N22 is a reference point between the AMF and a network slice selection function (NSSF), N23 is a reference point between the PCF and a network data analytics function (NWDAF), N24 is a reference point between the NSSF and the NWDAF, N27 is a reference point between a network repository function (NRF) in the visited network and the NRF in the home network, N31 is a reference point between NSSF in the visited network and NSSF in the home network, N32 is a reference point between security protection proxy (SEPP) in the visited network and SEPP in the home network, N33 is a reference point between a network exposure function (NEF) and the AF, N40 is a reference point between the SMF and a charging function (CHF), and N50 is a reference point between the AMF and a circuit bearer control function (CBCF).

Meanwhile, in FIG. 11, for convenience of description, a reference model for a case in which the UE accesses one DN using one PDU session is illustrated, but is not limited thereto.

In the following, for convenience of description, it is described based on the EPS system using an eNB, the eNB may be replaced with the 5G system using the gNB, the mobility management (MM) function of the MME may be replaced with the 5G system using the AMF, the SM function of S/P-GW may be replaced with the 5G system using the SMF, the user plane-related functions of the S/P-GW may be replaced with the 5G system using the UPF, etc.

In the above, the present disclosure has been described based on the EPS, but the content can be supported through similar operations through processes/messages/information for similar purposes in the 5G system.

Network Slicing

In the 5G system, a function called network slicing was introduced to increase the efficiency of system utilization (reference: 3GPP TR 23.799 v1.0.2 Annex B).

1. Network Slicing Concept

FIG. 12 is an example of a network slicing concept to which the present disclosure may be applied. Referring to FIG. 12, the concept of network slicing is composed of three layers: 1) a service instance layer, 2) a network slice instance layer, and 3) a resource layer.

The service instance layer represents the service to be supported (e.g. end-user service or business service). Each service is represented by a service instance. In general, the service may be provided by a network operator or a third party. Accordingly, the service instance may represent an operator service or a service provided by the third party.

The network operator creates a network slice instance using a network slice blueprint. The network slice instance provides network characteristics necessary for the service instance. The network slice instance may be shared by multiple service instances provided by the network operator. For reference, whether it is necessary to support sharing of the network slice instance between service instances provided by third parties should be discussed in standardization organizations (SDOs).

The network slice instance may be absent, or may be composed of one or more sub-network instances, and may be shared by other network slice instances. Similarly, a sub-network blueprint is used to create the sub-network instances, to form a series of network function set that run on physical/logical resources.

2. Definition

Service Instance: An instance of an end-user service or business service realized within or by a network slice.

Network Slice Instance: A set of network functions and resources that form a fully instantiated logical network to meet specific network characteristics required by the service instance:

The network slice instance may be completely or partially logically or physically separated from other network slice instances.

Resources are composed of physical and logical resources.

The network slice instance may be composed of the sub-network instance, and in special cases, it may be shared by multiple network slice instances. The network slice instance is defined as the network slice blueprint.

When creating the network slice instance, policy and configuration for each instance are required.

The network characteristics include, for example, ultra-low-latency and ultra-reliability, etc.

Network Slice Blueprint: It is the overall description of the structure, configuration and planning/work flow, and control over the life cycle of the network slice instance. The network slice blueprint enables instantiation of network slices to provide specific network characteristics (e.g. ultra-low latency, ultra-reliability, value-added services for enterprises, etc.). The network slice blueprint refers to the required physical/logical resources and/or sub-network blueprints.

Sub-network Instance: The sub-network instance is composed of resources for a series of network functions and for the following network functions:

The sub-network instance is defined as the sub-network blueprint.

The sub-network instance is not required to form a complete logical network.

Two or more network slices may share the sub-network instance.

Resources are composed of physical and logical resources.

Sub-network Blueprint: This is a description of the structure (and included components) of the sub-network instance, the configuration and planning/workflow of how to instantiate them. The sub-network blueprint refers to physical and logical resources and may refer to other sub-network blueprints.

Physical resource: Physical resources for computation, storage or transportation, including radio access:

Network functions are not regarded as resources.

Logical Resource: It refers to the division of physical resources or grouping of multiple physical resources shared for a specific network function or among a set of network functions.

Network function (NF): Network function means processing the function of the network.

This includes functions of communication nodes and switching functions (e.g. Ethernet switching functions, IP routing functions) but is not limited thereto.

VNF is a virtualized version of NF (refer to ETSI NFV for details on VNF).

Based on this, SA WG1 defined the following Potential Requirement through Services and Markets Technology Enablers (SMARTER) work.

3GPP TR 22.864 v14.0.0

6.1. Network Slicing 6.1.1 Description

Operators can provide customized networks through the network slicing. For example, it may have different requirements depending on the following. Functions (e.g. priority, charging, policy control, security and mobility), difference in performance needs (e.g. latency, mobility, availability, reliability and data rate), or when it should be provided only to specific users (e.g. MPS users, public safety users, corporate customers, roamers or MVNO hosting).

The network slice may provide the functions of the entire network, including radio access network functions and core network functions (e.g. potential functions of other vendors). One network may support one or several network slices.

6.1.2 Requirements

The 5G system must allow operators to create, modify and delete network slices.

The 5G system must allow the operators to define and update the set of services and functions supported in the network slice.

The 5G system must allow the operator to configure information that connects the UE to the network slice.

The 5G system must allow the operators to configure information that connects the service to the network slice.

The 5G system must allow the operators to allocate the UE to the network slice and remove the UE from the network slice based on subscriptions, UE functions, operator policies and services provided by the network slice.

The 5G system must support a service requiring VPLMN and a mechanism for allocating UEs to HPLMNs or basic network slices.

The 5G system must allocate UEs to two or more operator network slices simultaneously and allow the UEs to access to services.

Traffic and services of one network slice must not affect traffic and services of other network slices in the same network.

Creation, modification, and deletion of network slices must not affect the traffic and services of other network slices in the same network, or must have minimal impact.

The 5G system must support adequate capacity, that is, the capacity elasticity of the network slice.

The 5G system must allow network operators to define the minimum capacity available for network slices. The elasticity of the capacity of other network slices in the same network must not affect the availability of the minimum capacity of that network slice.

The 5G system must allow the network operator to define the maximum capacity of the network slice.

The 5G system must allow the network operator to define a priority order among different network slices when multiple network slices compete for resources on the same network.

The 5G systems must support a means by which the operator can add and remove network functions from the network so that they can be used in the network slice.

The 5G system must support a means by which the operator can differentiate between the policies, functions and performances provided by different network slices.

The 5G system must support connections to home and roaming users on the same network slice.

In a shared 5G network configuration, each operator must be able to apply all the requirements of the above provisions for the allocated network resources.

3GPP TS 23.501 v15.0.0 (December 2017)

5.15 Network Slicing 5.15.1 General

The network slice is defined in PLMN and must include the following.

Core network control plane and user plane network functions, as described in Article 4.2, Serving the PLMN must include at least one of the following:

NG radio access network described in 3GPP TS 38.300 [27]

N3IWF function for non-3GPP access networks, as described in Article 4.2.7.2

Network slices that support roaming are described in Article 5.15.6.

Network slices may differ depending on supported functions and optimization of network functions, in this case, the network slices may have different S-NSSAIs with different slice/service types (refer to subsection 5.15.2.1). Operators may provide exactly the same functions for providing differently proposed services or/and for application to specific customers, but may distribute the multiple network slice instances for different UE groups. For example, this network slice may have the different S-NSSAIs with the same slice/service type but different slice differentiators (see subsection 5.15.2.1).

The network may simultaneously provide one or more network slice instances through 5G-AN, and may be related to a total of eight different S-NSSAIs. The AMF instance serving the UE logically belongs to each network slice instance serving the UE. That is, this AMF instance is common to the network slice instance serving the UE. For reference, in the release of this specification, it is assumed that the AMF that can provide a service to the combination of S-NSSAI to be provided to an Allowed NSSAI can always be selected.

The selection of the network slice instance set for the UE is generally triggered by the AMF that first contacted in the registration procedure through interaction with the NSSF, and may lead to change of the AMF. This is described in more detail in Article 5.15.5.

A PDU session belongs to one specific network slice instance per PLMN, and different network slice instances do not share the PDU session for each slice using the same DNN.

During the handover procedure, the source AMF interacts with the NRF specified in Article 6.3.5 to select the target AMF.

5.15.2 Identification and selection of network slices: S-NSSAI and NSSAI 5.15.2.1 General S-NSSAI identifies the network slice.

S-NSSAI is configured as follows.

Slice/Service Type (SST) indicating expected network slice operation in terms of features and services Slice Differentator (SD)-Optional information that complements the Slice/Service type to distinguish multiple network slices of the same Slice/Service type.

The S-NSSAI may have a standard value (i.e. each S-NSSAI consists of only SSTs with standardized SST values, see Article 5.15.2.2, no SD) or a non-standard value (i.e. each S-NSSAI consists of either SST and SD, or without standardized SST values and SD). The S-NSSAI with non-standard values identifies a single network slice within the related PLMN. The S-NSSAI having non-standard values cannot be used for UEs in the access layer procedure of all other PLMNs except for the PLMN to which the S-NSSAI is related.

The HPLMN value is used for the S-NSSAI (see 6.6.2, TS 23.503 [45]) and Subscribed S-NSSAI in NSSP of the URSP rule (see Section 5.15.3). Also, Configured NSSAI, Allowed NSSAI (see Section 5.15.4.1) and Requested NSSAI (see Section 5.15.5.2.1) are used as part of the options for mapping to the Configured NSSAI for the HPLMN.

The Serving PLMN value is used for the S-NSSAI, the Allowed NSSAI (see Section 5.15.4.1) and the Requested NSSAI of the Configured NSSAI for the PLMN (see Section 5.15.5.2.1).

The NSSAI is a collection of the S-NSSAI. The NSSAI may be the Configured NSSAI, the Requested NSSAI, or Allowed NSSAI. In the Allowed and the Requested NSSAI, up to 8 S-NSSAIs may be transmitted as signaling messages between the UE and the network. Through the Requested NSAI signaled to the network by the UE, the network may select a serving AMF, network slice and the network slice instance for the UE as specified in subclause 5.15.5.

Based on the operator's operation or placement request, the network slice instance may be associated with one or more S-NSSAIs, and the S-NSSAI may be associated with one or more network slice instances. The multiple network slice instances related to the same S-NSSAI may be placed in the same tracking area or different tracking areas. When the multiple network slice instances related to the same S-NSSAI are placed in the same tracking area, the AMF instance serving the UE may belong to two or more network slice instances logically associated with this S-NSSAI (i.e. it can be common).

When the S-NSSAI is associated with more than one network slice instance in the PLMN, it serves the UEs allowed to use this S-NSSAI as a result of the network slice instance selection procedure defined in Article 5.15.5. In the case of the S-NSSAI, the network (for example, until the following network slice instances are no longer valid in a specific registration area, or until a change in the Allowed NSSAI of the UE occurs) may provide a service to the UE with only one network slice instance associated with the S-NSSAI at any time. In this case, the procedure referred to in 5.15.5.2.2 or 5.15.5.2.3 applies.

Based on the requested NSSAI (if any) and subscription information, the 5GC must select the network slice instance to provide service to the UE that includes the 5GC control plane and user plane network functions corresponding to the network slice instance.

The (R)AN may use the Requested NSSAI for access layer signaling to handle UE control plane connection before the 5GC notifies the (R)AN of the Allowed NSSAI. The Requested NSSAI is not used in the RAN for routing when the UE provides 5G-GUTI.

When the UE is successfully registered, the CN notifies the (R)AN of it by providing the Allowed NSSAI. For reference, details on how the RAN uses NSSAI information is described in TS 38.300 [27].

5.15.2.2 Standardized SST Value

The standardized SST value provides a method to establish global ineroperability for slicing so that the PLMN can more efficiently support roaming use cases for the most commonly used slice/service types. The standardized SST is illustrated in Table 2 below.

TABLE 2

| Slice/Service type | SST value | Characteristics. |
| --- | --- | --- |
| eMBB | 1 | Slice suitable for the handling of 5G enhanced Mobile Broadband. |
| URLLC | 2 | Slice suitable for the handling of ultra- reliable low latency communications. |
| MioT | 3 | Slice suitable for the handling of massive IoT. |

For reference, not all standardized SST values are required in the PLMN.

5.15.3 Subscription Aspects

The subscription information may include one or more S-NSSAI (i.e. the Subscribed S-NSSAI). A maximum of 8 Subscribed S-NSSAIs may be displayed as default S-NSSAIs. If displayed as the default S-NSSAI, when the UE does not send a valid S-NSSAI as part of the Requested NSSAI to the network in the registration request message, the network is expected to provide service to the UE associated with the appropriate network slice instance.

The subscription information for each S-NSSAI may include multiple DNNs and one default DNN.

The network verifies the Requested NSSAI provided by the UE in the registration request for the subscription information.

In the case of roaming, the UDM may provide a subset of the Subscribed S-NSSAI in the subscription information reflecting S-NSSAI set of the HPLMN available for UE in the VPLMN to the VPLMN.

5.15.4 UE NSSAI Configuration and NSSAI Storage Aspect 5.15.4.1 General

The UE may be configured by the HPLMN through slice configuration information.

The slice configuration information includes one or more Configured NSSAIs. The Configured NSSAI may be applied to one or all PLMNs that do not have a specific Configured NSSAI (e.g. for an NSSAI that includes only S-NSSAIs with standard values, see Article 5.15.2.1). There is at least one Configured NSSAI per PLMN.

The Configured NSSAI of the PLMN may include the S-NSSAI with a standard value or a PLMN-specific value.

The Configured NSSAI for the serving PLMN includes the S-NSSAI value that may be used for the serving PLMN and related to the mapping of each S-NSSAI value of the Configured NSSAI and the corresponding S-NSSAI value for the HPLMN.

The S-NSSAI of the Configured NSSAI for the HPLMN matches the Subscribed S-NSSAI for the UE at the time provided to the UE.

When providing the Requested NSSAI to the network at the time of registration, the UE of a specific PLMN includes and uses only the S-NSSAI applied to this PLMN, which may be related to mapping each S-NSSAI of the Requested NSSAI to the S-NSSAI of the Configured NSSAI for the HPLMN. The registration process of the UE has been successfully completed, the UE may obtain an Allowed NSSAI including one or more S-NSSAIs from the AMF, and map the Allowed NSSAI to the Configured NSSAI for the HPLMN. This S-NSSAI is valid for the current registration area provided by the serving AMF registered by the UE, and can be used simultaneously by the UE (depending on the number of maximum simultaneous network slices or the PDU sessions).

The UE may also obtain one or more rejected S-NSSAIs with the validity and reason for rejection from the AMF. The S-NSSAI may be rejected:
About PLMN or
About the current registration area.
While remaining a RM-RESTERED state in the PLMN, the UE cannot retry registration with the S-NSSAI rejected by the PLMN.

While remaining the RM-RESTERED in the PLMN, the UE cannot retry registration with the S-NSSAI rejected in the current registration area.

Note 1: More cases and details in which the S-NSSAI is rejected are described in TS 24.501 [47].

As described in Article 5.15.5, the UE should use only the S-NSSAI of the Allowed NSSAI that fits the network slice for the subsequent procedure of the serving PLMN.

The UE stores (S)NSSAIs as follows.
When the UE provisions the Configured NSSAI for the PLMN, and the mapping associated with the Configured NSSAI is optionally provided to the Configured NSSAI for the HPLMN, until a new Configured NSSAI for the PLMN is provisioned to the UE by the HPLMN, the Configured NSSAI and mapping should be stored in the UE:
When the new Configured NSSAI for the PLMN is provisioned, and a mapping optionally associated with the Configured NSSAI is provided to the Configured NSSAI for the HPLMN, the UE must replace all stored NSSAIs, new Configured NSSAIs and associated mappings for this PLMN, and delete all stored Allowed NSSAIs and rejected S-NSSAIs;

Note 2: The UE is expected to continue to store the received Configured NSSAI for the PLMN, even when registering with another PLMN. However, for the PLMNs other than the HPLMN, the number of the Configured NSSAIs that the UE will continue to store varies depending on the UE implementation.
When received, the related mapping of the Allowed NSSAI to the Allowed NSSAI for the PLMN and the Configured NSSAI for the HPLMN must be stored in the UE. The UE must also store the Allowed NSSAI when the UE is off.

Note 3: When the power is turned off, whether the UE stores the Allowed NSSAI depends on the UE implementation.
When a new Allowed NSSAI for the PLMN is received, the UE must replace all Allowed NSSAIs stored for this PLMN with this new Allowed NSSAI and associated mapping.
When received, the S-NSSAI permanently rejected by the PLMN is stored in the UE during RM-REGISTERED.
When received, the S-NSSAI rejected in the current registration area must be stored in the UE, and the RM-REGISTERED must be stored until the UE leaves the current registration area.

Note 4: The storage aspect of the rejected S-NSSAI is described in TS 24.501 [47].

One or more S-NSSAIs in the Allowed NSSAI provided to the UE may have a value that is not part of the slice configuration information of the UE for the serving PLMN. In this case, the Allowed NSSAI is related to information related to how each S-NSSAI of the Allowed NSSAI is mapped to each S-NSSAI(s) of the Configured NSSAI for the HPLMN. This mapping allows the UE to be allowed to a given application according to the NSSP of the URSP rule defined in 6.6.2, TS 23.503 [45] by the S-NSSAI corresponding to the Allowed NSSAI.

5.15.4.2 UE Network Slicing Configuration Update

At any time, the AMF may provide the UE with the new Configured NSSAI for the serving PLMN in relation to mapping the Configured NSSAI to the Configured NSSAI for the HPLMN. The AMF provides the new Configured NSSAI as specified in TS 23.502 [3], Article 4.2.4 UE configuration update procedure.

When the HPLMN performs a configuration update, it updates the Configured NSSAI for the HPLMN. The AMF provides the mapping information specified in Article 5.15.4.1.

The Configured NSSAI for the serving PLMN has been updated, and the UE that has deleted the stored Allowed NSSAI as described in 5.15.4.1 must initiate a registration procedure to receive a new valid Allowed NSSAI (see Section 5.15.5.2.1)

If necessary, updating of the URSP rule (including NSSP) is described in TS 23.503 [45].

5.15.5 Detailed Operation Overview
5.15.5.1 General

Configuration of a user plane connection for a data network through the network slice instance is composed of the following two steps.
Performing of RM procedure to select the AMF that supports required network slice
Configuration of one or more PDU sessions to the required data network through the network slice instances 5.15.5.2 Selecting the Serving AMF that Supports Network Slices
5.15.5.2.1 Registration in the Set of Network Slices When the UE registers with the PLMN, if there is the Configured NSSAI or Allowed NSSAI for these PLMNs, the UE must provide the Requested NSSAI including the S-NSSAI corresponding to the slice to be registered to the network of the RRC and NAS layers.

The Requested NSSAI must be one of the following.
If the UE does not have the Allowed NSSAI for the serving PLMN, Configured-NSSAI or a subset thereof described below; or
If the UE has the Allowed NSSAI for the serving PLMN, Allowed-NSSAI or a subset thereof described below; or
Allowed NSSAI or a subset described below, not rejected in the PLMN by the previous network and one or more S-NSSAIs of the S-NSSAI presented in the corresponding Allowed NSSAI and Configured-NSSAI that does not correspond.

A subset of Configured-NSSAI provided by the Requested NSSAI, if the S-NSSAI has not been rejected by the network in the previous PLMN, is composed of one or more S-NSSAIs of the Configured NSSAI applicable to this PLMN.

The UE must include the Requested NSSAI in RRC connection configuration and NAS message. However, the UE should not indicate NSSAI in the RRC connection configuration or initial NAS message unless there is the Configured NSSAI or Allowed NSSAI for the corresponding PLMN. The RAN must route NAS signaling between the selected AMF and this UE using the Requested NSSAI obtained during the RRC connection configuration. If the RAN cannot select the AMF based on the Requested NSSAI, the NAS signaling is routed from a default AMF set to the AMF. In a NAS signal, the UE provides each S-NSSAI mapping of the Requested NSSAI to the S-NSSAI of the Configured NSSAI for the HPLMN.

When the UE registers with the PLMN, if the Requested NSSAI is not included in this PLMN, the RAN must route all NAS signals to/from the UE and from/to the default AMF. When receiving the Requested NSSAI and 5G-S-TMSI of RRC from the UE, if the RAN can reach the AMF corresponding to 5GT, the RAN selects an appropriate AMF based on the Requested NSSAI provided by the UE and forwards these requests to the selected AMF. If the RAN cannot select the AMF based on the Requested NSSAI, the corresponding request is transmitted to the default AMF.

When the AMF selected by AN receives the UE initial registration request:

- As part of the registration procedure described in TS 23.502 [3], Article 4.2.2.2, the AMF may query the UDM to search for UE subscription information including the Subscribed S-NSSAI.
- The AMF checks whether the S-NSSAI of the Requested NSSAI is allowed based on the Subscribed S-NSSAI (in order to identify the Subscribed S-NSSAI, the AMF may use the mapping for the Configured NSSAI to the HPLMN provided by the UE in the NAS message for each S-NSSAI of the Requested NSSAI.)
- If the UE context of the AMF does not yet include the Allowed NSSAI, the AMF queries the NSSF (see (B) below for subsequent handling). However, the case where the AMF can determine whether to provide a service to the UE based on the configuration of the AMF is excluded (see (A) below for subsequent handling).

Note 1: The configuration of the AMF depends on the operator's policy.

- When the Allowed NSSAI is already included in the UE context of the AMF, the AMF may determine whether to provide a service to the UE based on the configuration of the AMF (see (A) below).

Note 2: The configuration of the AMF depends on the operator's policy.

(A) According to the configuration described above, the AMF may determine whether or not to provide a service to the UE, which is performed as follows:

- The AMF checks whether it can support all S-NSSAIs of the Requested NSSAI initiated from the Subscribed S-NSSAI (used for configuration for mapping the S-NSSAI values between the HPLMN and serving PLMN), or whether it can support all S-NSSAIs marked by default if Requested NSSAI is not provided (see 5.15.3)
- In this case, the AMF is maintained as the serving AMF of the UE. Then, if the S-NSSAI list of the Requested NSSAI allowed according to the Subscribed S-NSSAI or the Requested NSSAI is not provided, the Allowed NSSAI is composed of a list of all S-NSSAI(s) displayed by default in the Subscribed S-NSSAI (see C below for further processing). It also determines whether the S-NSSAI included in the Allowed NSSAI should be mapped to the Subscribed S-NSSAI value. Otherwise, the AMF queries the NSSF (see (B) below).

(B) As described above, if necessary, the AMF needs to query the NSSF, and does the following:

- The AMF maps the Requested NSSAI to the NSSF and the Configured NSSAI for the HPLMN to the Requested NSSAI, and queries the Subscribed S-NSSAI (when displayed as the default S-NSSAI), SUPI, and the PLMN ID of the UE's current tracking area.

Note: When the tracking area of two or more UE is displayed, the UE uses two or more access type.

- Based on other locally available information including RAN function in this local configuration and the tracking area of the current UE, the NSSF does the following.
- Check whether the S-NSSAI is allowed by Requested S-NSSAI and whether the Requested NSSAI is mapped to the Configured NSSAI for the HPLMN
- Select the network slice instance to serve the UE. When a plurality of network slice instances in the tracking area of the UE can service a specific S-NSSAI based on the operator's configuration, the NSSF may select one of them to service the UE, or defer the selection of the network slice instances until it is necessary to select NF/service within the network slice instance.
- After querying the NRF, determine a candidate AMF list based on a target AMF set or configuration to be used to service the UE.
- Determine the allowed NSSAI in consideration of the availability of the network slice instances described in Article 5.15.8 that can provide services to the S-NSSAI of the allowed NSSAI in the tracking area of the current UE.
- Also, if necessary, determine each S-NSSAI mapping of Allowed NSSAI to Subscribed S-SNSSAI.
- Depending on the operator configuration, the NSSF may determine the NRF to be used to select NF/service within the selected network slice instance.
- Additional processing to determine Allowed NSSAI in roaming scenario and mapping to the Subscribed S-NSSAI as described in Article 5.15.6.
- The NSSF returns the allowed NSSAI to the current AMF, and if the mapping is determined, the target AMF set or AMF candidate list. The NSSF may return the NRF to be used to select an NF/service within the selected network slice instance and the NRF to be used to determine a candidate AMF list from the AMF set. The NSSF may return an NSI ID to connect to the network slice instance corresponding to the specific S-NSSAI. The NSSF may return the rejected S-NSSAI as described in Article 5.15.4.1.
- Based on the available information and configuration, the AMF may query an appropriate NRF (e.g. NRF pre-configured locally or provided by NSSF) with the target AMF set. The NRF returns a list of the candidate AMFs.
- When re-routing to a target serving AMF is required, the current AMF reroutes the registration request from the AMF to the target serving AMF as described in Section 5.15.5.2.3.

(C) The serving AMF determines the registration area so that all S-NSSAIs of the Allowed NSSAI can be used in all tracking areas of the registration area (and also other aspects described in section 5.3.2.3 may be considered), and then must map (if provided) the Allowed NSSAI and Allowed NSSAI to the Subscribed S-NSSAI. The AMF may return the rejected S-NSSAI as described in section 5.15.4.1.

If the registration is successful, the 5G-S-TMSI is provided to the UE by the serving AMF. The UE must include the 5G-S-TMSI in all the RRC connection configurations that are initially being accessed later so that the RAN can route the NAS signal between the UE and a corresponding AMF.

When the UE receives the Allowed NSSAI from the serving AMF, the new Allowed NSSAI and Allowed NSSAI must be stored in the Configured NSSAI for the HPLMN (if any), all previously stored Allowed NSSAIs for this PLMN are overridden as described in 5.15.4.1.

If the Requested NSSAI is not included or the S-NSSAI is rejected by the PLMN, the AMF may update the UE slice configuration information for the PLMN as described in Article 5.15.4.2.

5.15.5.2.2 Network Slice Set Modification of UE

The network slice set for the UE may be changed at any time while the UE is registered with the network, and may be initiated by the network or the UE under specific conditions as follows.

The network based on local policy, subscription change and/or UE mobility may change the set of network slices in which the UE is registered and provide the new Allowed NSSAI to the UE for operational reasons (e.g. network slice instances are no longer provided). The network may trigger a notification of the change of the network slice to the UE by making these changes during the registration procedure or using the general UE configuration update procedure specified in TS 23.502 [3], Article 4.2.4. The new Allowed NSSAI is determined as described in Article 5.15.5.2.1 (AMF reassignment may be required). The AMF provides a list of the new Allowed NSSAI and TAI to the UE.

If the UE does not need to perform the registration procedure according to the Allowed NSSAI change:
The AMF indicates that approval is required, but does not indicate that registration procedures need to be carried out.
The UE responds with a UE configuration update complete message for the approval.
If the UE needs to perform the registration procedure according to the Allowed NSSAI changes (for example, the new S-NSSAI requires a separate AMF that cannot be determined as the current serving AMF):
The serving AMF indicates that the current 5G-GUTI is invalid, and indicates that the registration procedure should be performed after entering a CM-IDLE state. The AMF must release the NAS signaling connection to the UE so that it can enter the CM-IDLE according to local policy (e.g. immediate or delayed release). After the UE enters the CM-IDLE state, it initiates the registration procedure. The UE should include the SUPI and the Requested NSSAI matching the Allowed NSSAI in the registration request message.

In addition to sending the new Allowed NSSAI to the UE, when the network slice used for one or more PDU sessions is no longer available to the UE, the following applies:
When the network slice is no longer available in the same AMF (e.g. due to UE subscription change), the AMF instructs the SMF to release a PDU session ID corresponding to the related S-NSSAI. The SMF releases the PDU session according to Article 4.3.4.2 of TS 23.502 [3].
When the network slice is no longer available when the AMF is changed (for example, due to a change in the registration area), the new AMF instructs the existing AMF that the PDU session corresponding to the related S-NSSAI is released. The previous AMF notifies the corresponding SMF to release the designated PDU session. The SMF releases the PDU session described in Article 4.3.4 of TS 23.502 [3]. After that, the new AMF modifies the PDU session state accordingly. The PDU session context is released locally in the UE after receiving the PDU session state in the Registration Accept message.

The UE configures whether the ongoing traffic can be routed to the existing PDU session belonging to another network slice or the new PDU session related to the same/other network slice using UE Configuration (e.g. NSSP of the URSP rule).

In order to change the S-NSSAI set in use, the UE must initiate the registration procedure specified in Article 5.15.5.2.1.

The change of the S-NSSAI set (whether UE or network is initiated) to which the UE is registered can lead to the AMF changes as described in 5.15.5.2.1 according to the operator policy.

5.15.5.2.3 AMF Reassignment Due to Network Slice Support

In the PLMN registration procedure, when the network determines that the UE should be serviced by another AMF based on the aspect of the network slice, the AMF that first receives the registration request must redirect the registration request to another AMF through the RAN or through direct signaling between the initial AMF and the target AMF. The redirection message transmitted by the AMF through the RAN should include new AMF selection information for the UE.

In the case of a UE that has already been registered, the system must support the redirection of the UE's network starting from the serving AMF to the target AMF due to the consideration of the network slice (e.g. the operator has changed the mapping between the network slice instance and each service AMF). The operator policy determines whether or not redirection between the AMFs is allowed.

5.15.5.3 PDU Session Configuration in Network Slice

When the PDU session is configured as a DN in the network slice, data transmission is allowed in the network slice. The PDU session is related to the S-NSSAI and DNN. The UE registered with the PLMN and obtained the allowed NSSAI must indicate the S-NSSAI in the PDU session configuration procedure according to the NSSP of the URSP, and if possible, the DNN is related to the PDU session. The UE includes the appropriate S-NSSAI of Allowed NSSAI, when the Allowed NSSAI is mapped to the Configured NSSAI for the HPLMN, and includes the S-NSSAI with the corresponding value in the Configured NSSAI for the HPLMN.

If the URSP (including NSSP) is not available in the UE, the UE should not indicate the S-NSSAI in the PDU session configuration procedure.

The network operator (HPLMN) may provide the network slice selection policy (NSSP) to the UE as part of the URSP rule (see Section 6.6.2, TS 23.503 [45]). The NSSP rule connects the application with one or more Subscribed S-NSSAIs corresponding to the Subscribed S-NSSAI of the UE. Default rules for matching all applications to the Subscribed S-NSSAI may also be included. When a UE application related to the specific S-NSSAI requests data transmission,
When the UE has one or more PDU sessions established according to the specific S-NSSAI, unless other conditions of the UE prohibit the use of these PDU sessions, the UE routes the user data of this application to one of these PDU sessions. If the application provides the DNN, the UE also considers this DNN to determine the PDU session to use. This is described in detail in Article 6.6.2 of TS 23.503[45].
The UE should store the URSP rule including the NSSP as described in TS 23.503 [45].
If the UE does not have the PDU session configured as this specific S-NSSAI, the UE requests the new PDU session corresponding to this S-NSSAI and the DNN that the application can provide. In order for the RAN to select an appropriate resource for supporting the network slicing in the RAN, the RAN needs to know the network slice used by the UE. This is described in detail in Article 6.6.2 of TS 23.503[45].

If the AMF cannot determine the appropriate NRF to query the S-NSSAI provided by the UE, the AMF can query the NSSF with this specific S-NSSAI, location information, and the PLMN ID of SUPI. The NSSF determines and returns the appropriate NRF to be used to select NF/service within the selected network slice instance. In addition, the NSSF may return the NSI ID that identifies the network slice instance to be used for this S-NSSAI.

The SMF search and selection in the selected network slice instance is initiated by the AMF upon receiving the SM message to configure the PDU session from the UE. The appropriate NRF is used to support the search and selection of network functions required for the selected network slice instance.

The AMF queries the appropriate NRF to select the SMF from the network slice instance based on the S-NSSAI, DNN, NSI-ID (if available) and other information. When the UE triggers the PDU session configuration, the UE subscription and local operator policy, and the selected SMF configures the PDU session based on the S-NSSAI and DNN.

If the AMF belongs to several network slices, according to the configuration, the AMF may use the NRF at a level suitable for SMF selection.

For more information on the SMF selection, refer to Section 4.3.2.2.3 of TS 23.502 [3].

When the PDU session for the specific S-NSSAI is configured using the specific network slice instance, the CN provides it to (R). The S-NSSAI corresponding to this Network Slice instance allows the RAN to perform access specific functions.

5.15.6 Network Slicing Support for Roaming

For roaming scenario:
  If the UE uses only the standard S-NSSAI value, the same S-NSSAI value as the HPLMN can be used in the VPLMN.
  If the VPLMN and the HPLMN have SLAs to support non-standard S-NSSAI values in the VPLMN, the NSSF of the VPLMN maps the Subscribed S-NSSAI value to each S-NSSAI value to be used in the VPLMN. The S-NSSAI value to be used for the VPLMN is determined by the NSSF of the VPLMN based on the SLA. The NSSF of the VPLMN does not need to inform the HPLMN of the value used for the VPLMN.
  According to the operator's policy and the configuration of the AMF, the AMF may determine the mapping of the S-NSSAI value to be used in the VPLMN and the Subscribed S-NSSAI.
  As described in Article 5.15.5.2.1, the UE configures the Requested NSSAI. Map each S-NSSAI of the Requested NSSAI to S-NSSAI of the Configured NSSAI for the HPLMN.
  NSSF of the VPLMN determines Allowed NSSAI without interacting with the HPLMN.
  The Allowed NSSAI of Registration Accept includes the S-NSSAI value used in the VPLMN. The mapping information described above is also provided to the UE with the Allowed NSSAI described in Article 5.15.4.
  In the PDU session configuration procedure, the UE includes the Subscribed S-NSSAI (S-NSSAI having a value defined in the HPLMN) and the related (mapped) S-NSSAI of the Allowed NSSAI (S-NSSAI having a value defined in the VPLMN) in the NSSAI based on the NSSP. In the case of home routing, the V-SMF transmits a PDU session configuration request message to the H-SMF together with the S-NSSAI having the value of the HPLMN.
  When the PDU session is configured, the CN provides the VPLMN value corresponding to this PDU session to the S-NSSAI as described in Article 5.15.5.3.
  The network slice instance specific network function of the VPLMN uses S-NSSAI using the value of the VPLMN and is selected from the VPLMN by querying the NRF pre-configured or provided by the NSSF of the VPLMN. The network slice specific function (if applicable) of the HPLMN is selected by the VPLMN using the corresponding NRF of the HPLMN identified as specified in Article 4.17.5 of TS 23.502 [3] and related S-NSSAI with the value of the HPLMN through support for SMF in TS 23.502.3 [3].

5.15.7 Network Slicing and Interaction with EPS 5.15.7.1 General

The 5GC, which supports network slicing, requires interaction with the PLMN or the EPS of another PLMN. The EPC may support a dedicated core network (DCN). In some placement, MME selection may be supported by DCN-ID provided by the UE to the RAN (see TS 23.401 [26]).

Mobility between the EPCs in the 5GC does not guarantee that all active PDU sessions can be transmitted to the EPC.

When configuring a PDN connection within the EPC, the UE allocates the PDU session ID and transmits it to PGW-C+SMF through PCO. The S-NSSAI related to the PDN connection is determined based on the operator policy by the PGW-C+SMF, and is transmitted from the PCO to the UE, for example, based on the combination of the PGW-C+SMF address and APN. The UE stores the S-NSSAI related to the PDN connection.

5.15.7.2 Side of IDLE Mode

In addition to the interaction principles described in Section 5.17.2, the following applies to interactions with N26:
  When the UE moves from 5GS to the EPS, MM context information transmitted from the AMF to the MME includes the type of UE usage retrieved from the AMF to the UDM as part of the subscription data.
  When the UE moves from the EPS to the 5GS, the UE includes the S-NSSAI related to the PDN connection established in the RRC and the Requested NSSAI of the NAS. The UE also includes the S-NSSAI list related to the PDU session ID in the registration request. In the case of home routing roaming, the AMF selects the V-SMF based on the S-NSSAI received from the UE.

In addition to the interaction principles described in Section 5.17.2, the following applies to interactions without N26:
  When moving the PDN connection to the 5GC using the PDU session configuration request, the UE includes the S-NSSAI received from the PGW-C/SMF.

5.15.7.3 Side of CONNECTED Mode

In addition to the interaction principles described in Section 5.17.2, the following applies to interactions with N26:
  When a handover to the EPS occurs by CM-CONNECTing the UE in the 5GC, the AMF selects the target MME based on the source AMF Region ID, AMF Set ID, and target location information. The AMF delivers the UE context to the selected MME through the N26 interface. The handover procedure is executed as described in TS 23.502 [3]. Upon completion of the handover, the UE performs tracking area update. This completes the UE registration of the target EPS. As part of this operation, the UE obtains the DCN-ID when the target EPS uses the DCN-ID.

When performing a handover to 5GS by ECM-CONNECT the UE in the EPC, the MME selects the target AMF based on target location information, for example, TAI and other available local information (including UE usage type if the UE is available in subscription data), and delivers the UE context to the selected AMF through the N26 interface. In the home routing roaming case, the AMF selects the default V-SMF. The handover procedure is executed as described in TS 23.502 [3]. Upon completion of the handover, the UE performs a registration procedure including a list of PDU session IDs and a list of related S-NSSAIs. The AMF may select select another AMF as specified in Article 4.2.2.2.3 of TS 23.502 [3]. Through this, registration of the UE to the target 5GS is completed, and as part of that, the UE acquires the Allowed NSSAI.

5.15.8 Network Slice Availability Configuration in PLMN

A network slice can be used in the entire PLMN or in one or more PLMN tracking areas.

The availability of network slices implies the support of NSAI in the involved NF. In addition, the NSSF policy may further restrict the use of a specific network slice in a specific TA according to, for example, the HPLMN of the UE.

The availability of network slices in TA is established in an end-to-end manner by using a combination of signal transmission between OAM and network functions. This is derived using the S-NSSAI supported for each TA of the NG-RAN, the S-NSSAI supported by the AMF, and operator policy per TA of the NSSF.

When the NG-RAN node configures or updates the AMF and N2 connection, the AMF learns the S-NSSAI supported by the NG-RAN for each TA (see TS 38.413 [34] and TS 38.300 [27]). One or all AMFs per the AMF set provide and update the NSSF with support for the 5-NSSAIs per the TA. The NG-RAN learns the S-NSSAIs when the NG-RAN node configures an NG2 connection with the AMF or when the AMF updates the N2 connection with the NG-RAN (see TS 38.413 [34] and TS 38.300 [27]).

The NSSF may be configured as an operator policy specified in the conditions that can restrict the S-NSSAI according to the HPLMN and TA of the UE.

The limited S-NSSAI per the TA may be provided to the AMF of the AMF set at the time of network configuration and change.

The AMF may be configured for the S-NSSAI supported by the operator policy specifying restrictions according to the HPLMN and TA of the UE.

3.1.4

In the 5G radio protocol layer, data received from an upper layer is multiplexed and transmitted, and in order to efficiently use limited radio resources, the following operation is performed.

TS38.321

5.4.3.1 Logical Channel Priority Configuration 5.4.3.1.1 General

Whenever a new transmission is performed, a logical channel priority (LCP) procedure is applied.

RRC controls the scheduling of uplink data through signaling for each logical channel per MAC entity.

priority indicates that when the priority value increases, the priority level decreases;
prioritisedBitRate configures prioritised bit rate (PBR);
buketSizeDuration configures buffet sizeDuration (BSD);

The RRC additionally controls the LCP procedure by configuring mapping restrictions for each logical channel.
allowedSCS-List to configure an allowed subcarrier interval for transmission;
maxPUSCH-Duration configures the maximum PUSCH duration allowed for transmission;
configuredGrantType1Allowed configures whether or not the configured grant type 1 can be used for transmission;
allowedServingCells configures cells allowed for transmission;

The following UE variables are used in the logical channel priority procedure.

Bj is maintained for each logical channel j.

The MAC entity initializes Bj of the logical channel to 0 when the logical channel is configured.

For each logical channel j, the MAC entity must do the following.
1> Increase Bj by product PBR×T before every instance of the LCP procedure. Where T is the time that has elapsed since Bj was last increased.
1> When the Bj value is larger than the size of the bucket (e.g. PBR×BSD):
2> Configure Bj as the size of the bucket.

For reference, the exact moment when the UE updates Bj between LCP procedures depends on the UE implementation if Bj is up-to-date at the time the grant is processed by the LCP.

5.4.3.1.2 Logical Channel Selection

When performing a new transmission, the MAC entity must do the following.
1> Select a logical channel for each UL grant that meets all of the following conditions:
2> Includes a set of subcarrier interval index values allowed in the allowedSCS-List (if configured), and subcarrier interval indexes related to UL assignment;
2> maxPUSCH-Duration (if configured) is greater than or equal to the UL grant-related PUSCH transmission duration;
2> configuredGrantType1Allowed (if configured) is configured as TRUE if UL grant is configured grant type 1;
2> allowedServingCells (if configured) includes information about UL subsidy-related cells. PDCP replication does not apply to logical channels related to DRB configured with disabled PDCP replication.

For reference, the subcarrier interval index, PUSCH transmission period, and cell information are included in uplink transmission information received at the lower layer corresponding to the scheduled uplink transmission.

As the 3GPP system evolves from 4G to 5G, a new scenario that has begun to attract attention is the smart factory. As machines in the factory are connected to each other, the smart factory operates the machine remotely, or enables efficient operation as a whole by collecting data generated by each mechanical device. In the past, there have been many tasks to connect the machine facilities of factories using communication, and a wired network was used due to technical limitations. However, 5G provides security services through network slicing, and 5G enables ultra-low-latency ultra-wideband communication, which has evolved to a level that can replace communication using the existing wired network.

However, in a factory-like environment, above all, efficient support for security is essential. This is because systems and machines operated in factories can cause major disasters even with small delays or malfunctions. To this end, a method of providing a separate and dedicated network slice for communication between systems or machines operated in the factory has been proposed. However, on the one hand, these machines need to be regularly inspected or program updated, and communication for these may have relatively low security requirements. On the other hand, it is possible to consider the terminals of workers working in the factory, in some cases, these workers' terminals need to communicate with other devices inside the factory, and on the other hand, these workers' terminals need to communicate with general servers outside the factory.

In this case, the use of different slices may be designated for each purpose. That is, data generated by each application is configured to use a predetermined network slice. However, each slice is mapped to the PDU session, and according to a certain rule within this PDU session, each data is transmitted through a radio bearer configured between the terminal and the base station. Here, the base station allocates radio resources to each terminal, and the terminal generates MAC PDUs using data generated from the upper end according to the radio resource allocated to the terminal and transmits the MAC PDUs to the base station. In this process, when data generated from different slices are mixed in each MAC PDU, a problem may arise that QoS configured according to each slice is not guaranteed. For example, when slice A has high data and high latency, and slice B needs low data and low latency, when the above two data are mixed and transmitted at the same time, for example, if data is transmitted according to low latency, the QoS requirement of slice B is satisfied, but the Qos requirement of slice A is not properly satisfied. In addition, in terms of the independence of slices, mixing data of different properties is not desirable in terms of security.

Likewise, radio resources such as RACH are used for various purposes by various terminals. For example, it is used for transition from idle or inactive mode to rrc connected, or it is used for beam failure recovery. However, even in this case, if slices of different characteristics try to access one radio resource in common, this causes congestion of the same RACH resource, for example, there is a problem that an application or a terminal that intends to use a relatively important slice is blocked from being used by a user or application of another slice.

In the present disclosure, the network delivers information on whether the logical channel can be multiplexed like any other logical channel or whether multiplexing is prohibited to the terminal for each logical channel, when data that the terminal must transmit to the network has occurred and the terminal is allocated radio resources that can be used for uplink transmission from the network, the terminal first identifies a logical channel with the highest priority that can use radio resources, and selects a logical channel allowed to perform multiplexing like the logical channel based on this, thereafter, in the process of configuring a data block to be transmitted using the radio resource, after configuring a data block including only data of the logical channel having the highest priority and data of a logical channel allowed to perform multiplexing, like the logical channel, in the data block, the terminal transmits using the allocated radio resource. In the above process, when there is no information on a logical channel allowed to perform multiplexing, and there is information on a logical channel in which multiplexing is prohibited, in the above process, the terminal includes only data of the remaining logical channels, except for the logical channels for which multiplexing is prohibited, among the logical channels having data to be transmitted, in the data block.

For this, additionally, in the core network, in the process of transmitting the information of the network slice related to each PDU session to the wireless network, additionally, the PDu session/network slice may transmit information on whether multiplexing with data of any other PDU session/network slice is allowed or not. Based on this information, in the wireless network, additionally, information on which pdu session/network slice/logical channel data is multiplexing with which pdu session/network slice/logical channel data is allowed or not allowed is transmitted to the terminal. The terminal may take the above-mentioned operation based on this.

1.1

In another aspect of the present disclosure, pdu session/network slice/logical channel group information allowed to be multiplexed and transmitted may be configured and transmitted to the terminal through the same radio resource in a wireless network. For example, if there is a logical channel a/b/c/d, for example, in a wireless network the allowed combination of logical channels, for example, if only combinations of (a,b,c) (b,c) (a,c) (d) are allowed, this can be notified to the terminal. Based on this, the terminal configures and transmits a data block composed of the above allowed combinations.

1.1.1.

In the above process, an identifier may be additionally allocated to an allowed combination of logical channels, and a radio resource allocation identifier (RNTI) associated therewith may be allocated respectively. Using the above example, RNTI_1, RNTI_2, RNTI_3, and RNTI_4 are allocated to each of the logical channel combinations of (a,b,c) (b,c) (a,c) and (d). And, in the process of allocating radio resources to the terminal, in order to inform which logical channel combination to allocate radio resources, the wireless network uses a radio resource allocation identifier according to the logical channel combination, and the terminal may, using this, know which logical channel data should be included in the radio resource allocated to itself, and configures and transmits a data block accordingly. For example, RNTI_2 is allocated to a combination of logical channels (b, c), and if the base station allocates radio resources using the RNTI_2, the terminal transmits data including only logical channel b and logical channel c to the data block to be transmitted using the allocated radio resource.

A similar mechanism can be used for configuring information using network slices and PdU sessions.

2.

Although described above in terms of radio resource allocation, a similar method can be applied to a common radio resource, for example, a RACH process. For example, the wireless network transmits information on a network slice, a logical channel type, etc. allowed for each radio resource for the radio resources managed by the self, and allows the terminals to operate accordingly. For example, if two RACH resources are available to a cell managed by the wireless network, one RACH may be allocated to slice A and the other RACH may be allocated to slice B. Based on this, when data is generated in slice A, the terminal uses the first RACH, and when data is generated in slice B, the terminal uses a random access procedure using the second RACh.

By the way, if information on a logical channel or slice should not be publicly known, the information cannot be delivered through the SIB. In this case, the wireless network informs which logical channel, slice, or PDU session each is mapped to for radio resources such as RACH through dedicated signaling, and the terminal operates accordingly.

In particular, when a certain radio resource is not a general-purpose radio resource, but a network slice allocated to a terminal or application with a special permission, information on the allowed conditions may be notified to the terminal and used only when it is satisfied so that only the allowed terminal application or terminal may be used.

FIG. 13 is an embodiment to which the present disclosure may be applied.

A core network node transmits first multiplexing information to a base station (S1310). The first multiplexing information includes information related to a PDU session or network slice in which multiplexing is allowed in the base station. For example, in the process of transmitting the information of the network slice related to each PDU session to the base station, the first multiplexing information includes information on whether the PDu session/network slice allows multiplexing with data of any other PDU session/network slice or not.

The base station transmits second multiplexing information to the terminal (S1320). The second multiplexing information includes information on a logical channel related to multiplexing in the base station. For example, the second multiplexing information includes information on whether the logical channel can be multiplexed like any other logical channel or whether multiplexing is prohibited for each logical channel.

The terminal generates a data block based on the second multiplexing information (S1330). For example, the terminal identifies a logical channel with the highest priority that can use radio resources, and selects a logical channel allowed to perform multiplexing like the logical channel based on this, thereafter, in the process of configuring a data block to be transmitted using the radio resource, the terminal may configure a data block including only data of the logical channel having the highest priority and data of a logical channel allowed to perform multiplexing, like the logical channel, in the data block.

The terminal transmits the generated data block to the base station (S1340).

FIG. 14 is an embodiment of a base station to which the present disclosure may be applied.

A base station receives first multiplexing information from a core network node (S1410). For example, the first multiplexing information includes information related to a PDU session or network slice in which multiplexing is allowed in the base station.

The base station transmits second multiplexing information to the terminal (S1420). When receiving the first multiplexing information, the base station may further include first multiplexing information in the second multiplexing information.

The base station receives a data block from the terminal (S1430).

In all the above descriptions, the present disclosure has been mainly described with EPC/EUTRAN/EUTRA, but in other cases, for example, NR/NG-RAN/5GCN can be similarly applied. In addition, the above configuration may be performed by the user directly at the terminal, or the configuration may be transmitted from the HPLMN to the terminal. In the above, the HPLMN is used in the same meaning as a home operator.

Overview of Devices to which the Present Disclosure can be Applied

FIG. 15 illustrates a block diagram of a communication device according to an embodiment of the present disclosure.

Referring to FIG. 15, a wireless communication system includes a network node 1510 and a plurality of UEs 1520.

The network node 1510 includes a processor 1511, a memory 1512, and a communication module 1513 (transceiver). The processor 1511 implements the functions, processes and/or methods proposed in FIGS. 1 to 14 above. Layers of wired/wireless interface protocol may be implemented by the processor 1511.

The memory 1512, being connected to the processor 1511, stores various information for driving the processor 1511. The communication module 1513 module, being connected to the processor 1511, transmits and/or receives wired/wireless signals. As an example of the network node 1510, a base station, AMF, SMF, UDF, etc. may correspond to this. In particular, when the network node 1510 is the base station, the communication module 1513 may include a radio frequency (RF) unit for transmitting/receiving a radio signal.

The UE 1520 includes a processor 1521, a memory 1522, and a communication module (or RF unit) 1523 (transceiver). The processor 1521 implements the functions, processes and/or methods proposed in FIGS. 1 to 14 above. Layers of a wireless interface protocol may be implemented by the processor 1521. In particular, the processor may include a NAS layer and an AS layer. The memory 1522, being connected to the processor 1521, stores various information for driving the processor 1521. The communication module 1523, being connected to the processor 1521, transmits and/or receives radio signals.

The memory 1512, 1522 may be inside or outside the processor 1511, 1521 and connected to the processor 1511, 1521 through various well-known means. In addition, the network node 1510 (in the case of a base station) and/or the UE 1520 may have a single antenna or multiple antennas.

FIG. 16 illustrates a block diagram of a communication device according to an embodiment of the present disclosure.

Particularly, FIG. 16 illustrates the UE of FIG. 15 above in more detail. The communication module shown in FIG. 15 includes an RF module (or RF unit) of FIG. 16. The processor shown in FIG. 15 corresponds to the processor (or digital signal processor (DSP) 1610) in FIG. 16. The memory shown in FIG. 15 corresponds to the memory 1630 of FIG. 16.

Referring to FIG. 16, the UE includes a processor (or digital signal processor (DSP)) 1610, an RF module (or RF unit) 1635, a power management module 1605, an antenna 1640, a battery 1655, a display 1615, a keypad 1620, a memory 1630, a subscriber identification module (SIM) card 1625 (which may be optional), a speaker 1645 and a microphone 1650. The UE may also include a single antenna or multiple antennas.

The processor 1610 may implement the functions, processes and/or methods proposed above. Layers of a wireless interface protocol may be implemented by the processor 1610.

The memory 1630 is connected to the processor 1610 and stores information related to operations of the processor 1610. The memory 1630 may be located inside or outside the processor 1610 and may be connected to the processor 1610 through various well-known means.

A user enters command information, such as a telephone number, for example, by pushing (or touching) buttons of the keypad 1620 or by voice activation using the microphone 1650. The processor 1610 receives the command information and processes to perform the appropriate function, such as to dial the telephone number. Operational data may be extracted from the SIM card 1625 or the memory 1630. Furthermore, the processor 1610 may display the command information or operational information on the display 1615 for the user's recognition and convenience.

The RF module 1635 is connected to the processor 1610 to transmit and/or receives an RF signal. The processor 1610 forwards the command information to the RF module 1635, to initiate communication, for example, to transmit radio signals comprising voice communication data. The RF module 1635 is comprised of a receiver and a transmitter for receiving and transmitting radio signals. The antenna 1640 functions to transmit and receive radio signals. Upon receiving the radio signals, the RF module 1635 may forward the signal for processing by the processor 1610 and convert the signal to baseband. The processed signals may be converted into audible or readable information output via the speaker 1645.

In the present disclosure, the wireless device may be a base station, a network node, a transmission terminal, a reception terminal, a radio device, a wireless communication device, a vehicle, a vehicle on which a self-driving function is mounted, a drone (unmanned aerial vehicle (UAV)), an artificial intelligence (AI) module, a robot, an augmented reality (AR) device, a virtual reality (VR) device, an MTC device, an IoT device, a medical device, a FinTech device (or financial device), a security device, a climate/environment device, or a device related to the fourth industrial revolution field or 5G service in addition to the devices. For example, the drone may be a flight vehicle that flies by a wireless control signal without a person being on the flight vehicle. For example, the MTC device and the IoT device are devices that do not require a person's direct intervention or manipulation, and may include a smart meter, a vending machine, a thermometer, a smart bulb, a door lock or a variety of sensors. For example, the medical device may be a device used for the purpose of diagnosing, treating, reducing, handling or preventing a disease or a device used for the purpose of testing, substituting or modifying a structure or function, and may include equipment for medical treatment, a device for operation, a device for (external) diagnosis, a hearing aid or a device for a surgical procedure. For example, the security device is a device installed to prevent a possible danger and to maintain safety, and may be a camera, CCTV, or a blackbox. For example, the FinTech device is a device capable of providing financial services, such as mobile payment, and may include a payment device or point of sales (POS). For example, the climate/environment device may mean a device for monitoring or predicting a climate/environment.

The mobile terminal described in the present disclosure may include a mobile phone, a smart phone, a laptop computer, a terminal for digital broadcasting, a personal digital assistants (PDA), a portable multimedia player (PMP), a navigator, a slate PC, a tablet PC, an ultrabook, a wearable device (e.g., a watch type terminal (smartwatch), a glass type terminal (smart glass), a head mounted display (HMD)), and so on. Furthermore, the mobile terminal may be used to control at least one device in an Internet of Things (IoT) environment or a smart greenhouse.

However, a person skilled in the art will easily understand that the configuration according to the embodiments described in the present disclosure may be applied to stationary devices, such as digital TV, a desktop computer, and digital signage except a case where the configuration is applicable to mobile terminal.

The embodiments related to a control method which may be implemented in the mobile terminal configured as described above have been described with reference to the accompanying drawings. It is evident to those skilled in the art that the present disclosure may be materialized in another specific form without departing from the spirit and essential characteristics of the present disclosure.

The aforementioned embodiments of the present disclosure may be implemented through various means. For example, the embodiments of the present disclosure may be implemented by hardware, firmware or software, or a combination thereof.

In the case of an implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of an implementation by firmware or software, a method according to the embodiments of the present disclosure may be implemented in the form of a device, a procedure, or a function that performs the aforementioned functions or operations. A software code may be stored in the memory unit and executed by the processor. The memory unit may be positioned inside or outside the processor and may transmit and receive data to/from the processor by already various means The present disclosure may be implemented as a computer-readable code in a medium in which a program is written. The computer-readable medium includes all types of recording devices in which data readable by a computer system is stored. Examples of the computer-readable medium include a hard disk drive (HDD), a solid state disk (SSD), a silicon disk drive (SDD), a ROM, a RAM, a CD-ROM, magnetic tapes, floppy disks, and optical data storages, and also include that the computer-readable medium is implemented in the form of carrier waves (e.g., transmission through the Internet). Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

INDUSTRIAL APPLICABILITY

The aforementioned communication method may be applied to various wireless communication systems including IEEE 802.16x and 802.11x systems in addition to a 3GPP system. Furthermore, the proposed method may also be applied to an mmWave communication system using an ultra-high frequency band.

The invention claimed is:

1. A method of supporting data transmission by a base station in a wireless communication system, the method comprising:
   transmitting, to a terminal, first multiplexing information of a network slice related to each protocol data unit (PDU) session including whether a multiplexing of the network slice with any other network slice is allowed;
   transmitting, to the terminal, random access configuration information; and
   receiving, from the terminal by a random access procedure through a radio access resource, a data block generated based on a combination of network slices allowed to be multiplexed and transmitted through a same radio access resource,
wherein the first multiplexing information further includes information on a logical channel related to multiplexing in the base station,
wherein the random access configuration information includes random access configuration information designated for each network slice, and
wherein the radio access resource for the random access procedure is allocated differently for each network slice.

2. The method of claim 1, wherein the first multiplexing information further includes a radio resource allocation identifier related to a logical channel in which multiplexing is allowed in the base station.

3. The method of claim 1, further comprising:
receiving second multiplexing information from a core network node,
wherein the second multiplexing information includes information related to a PDU session or network slice in which multiplexing is allowed in the base station.

4. The method of claim 3, wherein the first multiplexing information further includes information related to the second multiplexing information based on the second multiplexing information received.

5. The method of claim 1, wherein the data block is generated in the terminal based on a priority of the logical channel.

6. A terminal for transmitting data using a network slice in a wireless communication system, the terminal comprising:
a transceiver;
a memory; and
a processor configured to control the transceiver and the memory,
wherein the processor is configured to:
receive information of a network slice related to each protocol data unit (PDU) session including whether a multiplexing of the network slice with any other network slice is allowed;
receive random access configuration information from a base station,
generate a data block based on a combination of network slices allowed to be multiplexed and transmitted through a same radio access resource,
select a radio access resource corresponding to the combination of network slices based on the random access configuration information, and
perform a random access procedure through the radio access resource,
wherein the random access configuration information includes random access configuration information designated for each network slice, and
wherein the radio access resource for the random access procedure is allocated differently for each network slice.

7. The terminal of claim 6, wherein the random access procedure is performed through a medium access control (MAC) entity.

8. The terminal of claim 6, wherein the random access configuration information is received through a system information block (SIB).

9. A method of transmitting data using a network slice by a terminal in a wireless communication system, the method comprising:
receiving information of a network slice related to each protocol data unit (PDU) session including whether a multiplexing of the network slice with any other network slice is allowed;
receiving random access configuration information from a base station;
generating a data block based on a combination of network slices allowed to be multiplexed and transmitted through a same radio access resource;
selecting a radio access resource corresponding to the combination of network slices based on the random access configuration information; and
performing a random access procedure through the radio access resource,
wherein the random access configuration information includes random access configuration information designated for each network slice, and
wherein the radio access resource for the random access procedure is allocated differently for each network slice.

10. The method of claim 9, wherein the random access procedure is performed through a medium access control (MAC) entity.

11. The method of claim 9, wherein the random access configuration is received through a system information block (SIB).

* * * * *